US009016161B2

(12) United States Patent
Sakurahara

(10) Patent No.: US 9,016,161 B2
(45) Date of Patent: Apr. 28, 2015

(54) WORKING VEHICLE

(75) Inventor: Kiyofumi Sakurahara, Ehime (JP)

(73) Assignee: Iseki & Co., Ltd., Ehime-ken (JP)

( * ) Notice: Subject to any disclaimer, the term of this patent is extended or adjusted under 35 U.S.C. 154(b) by 482 days.

(21) Appl. No.: 13/417,624

(22) Filed: Mar. 12, 2012

(65) Prior Publication Data

US 2013/0186227 A1 Jul. 25, 2013

(30) Foreign Application Priority Data

Jan. 25, 2012 (JP) ................................. 2012-013279

(51) Int. Cl.
*G05G 1/04* (2006.01)
*B62D 1/16* (2006.01)
*E02F 9/08* (2006.01)

(52) U.S. Cl.
CPC ................ *G05G 1/04* (2013.01); *E02F 9/0833* (2013.01); *E02F 9/0875* (2013.01)

(58) Field of Classification Search
CPC ....... B66F 9/0759; G05G 1/04; E02F 9/0875; E02F 9/0833; B62D 1/16
USPC .............................................. 74/492; 280/779
See application file for complete search history.

(56) References Cited

U.S. PATENT DOCUMENTS

| | | | | |
|---|---|---|---|---|
| 3,266,846 | A * | 8/1966 | Luksch et al. | 299/39.9 |
| 3,642,086 | A * | 2/1972 | Andrews | 180/306 |
| 5,950,336 | A * | 9/1999 | Liebl | 37/231 |
| 6,629,704 | B2 * | 10/2003 | Eckhart | 280/779 |
| 7,558,658 | B2 | 7/2009 | Kuramoto et al. | |
| 2011/0314953 | A1 * | 12/2011 | Nakamura et al. | 74/493 |

FOREIGN PATENT DOCUMENTS

| | | | | |
|---|---|---|---|---|
| JP | 09286341 | A * | 11/1997 | B62D 1/16 |
| JP | 2006-304691 | A | 11/2006 | |
| JP | 2007-8317 | A | 1/2007 | |

* cited by examiner

*Primary Examiner* — Keith Frisby
(74) *Attorney, Agent, or Firm* — RatnerPrestia

(57) ABSTRACT

A working vehicle attachable an implement such as front loader includes a steering wheel, a steering column frame which supports the steering wheel and has a shape that is long in lengthwise direction, a joy-stick control lever which is disposed in a lateral side of the steering wheel, and a valve which is disposed on an outside face of the steering column frame and is connected to the joy-stick control lever. Accordingly, since the valve is disposed on the outside face of the steering column frame, it becomes easy to perform an assembling work, maintenance check work and the like with respect to the valve.

3 Claims, 19 Drawing Sheets

WORKING VEHICLE

BACKGROUND OF THE INVENTION

1. Field of the Invention

The present invention relates to a working vehicle such as a tractor, which is provided with an engine at the front portion thereof, and the working vehicle of which an implement is attachable to the front or rear portion thereof.

2. Related Art of the Invention

A tractor is known as a conventional example of a working vehicle of which a front loader, as an example of the implement, is attached to a front portion.

A frame structure for supporting a steering wheel is disposed vertically at the rear portion of the engine compartment of such conventional tractor, and a valve is disposed below the steering wheel. The valve is connected to a lift cylinder and a bucket cylinder which move a front loader and a bucket. An operation lever for operating the valve is disposed at the upper right side of the frame structure.

SUMMARY OF THE INVENTION

Technical Problems

However, according to the conventional working vehicle described above, since the valve is disposed below the steering wheel, there is a technical problem that it is difficult to attach or detach the valve.

In view of the above described problem of the conventional working vehicle, the present invention is directed to a working vehicle having a constitution in which it can be easy to attach and detach a valve.

Means for Solving the Problems

To achieve the above described purpose of the present invention, the 1$^{st}$ aspect of the present invention is a working vehicle attachable an implement, comprising:

a steering wheel;

a steering column frame which supports the steering wheel and has a long shape in a vertical direction;

an operation lever which is disposed in a lateral side of the steering wheel; and a valve which is disposed on an outside face of the steering column frame and is connected to the operation lever.

According to the working vehicle mentioned above, since the valve is disposed on an outside face of the steering column frame, it becomes easy to perform an assembling work, maintenance check work and the like with respect to the valve.

The 2$^{nd}$ aspect of the present invention is the working vehicle according to the 1$^{st}$ aspect of the present invention, wherein a concave part is formed on the outside face of the steering column frame.

According to the working vehicle mentioned above, since the valve is disposed in the concave part, it can be restrained that dimensions of the right and left width of the steering column frame become longer, and a compact constitution can be obtained.

The 3$^{rd}$ aspect of the present invention is the working vehicle according to the 2$^{nd}$ aspect of the present invention, wherein whole or a part of the valve is disposed in the concave part.

According to the working vehicle mentioned above, since the valve is disposed in the concave part, it can be restrained that dimensions of the right and left width of the steering column frame become longer, and a compact constitution can be obtained.

The 4$^{th}$ aspect of the present invention is the working vehicle according to the 3$^{rd}$ aspect of the present invention, comprising:

a valve fixing member which fixes the valve to the steering column frame, wherein the steering column frame has a first side wall extending from a side face of the concave to a front direction, a second side wall extending from the first side wall to a lateral direction, and a third side wall extending from the second side wall to a rear direction; and the valve fixing member is fixed to the side face of the concave, the first side wall, and any one of the third side wall and the second side wall.

According to the working vehicle mentioned above, the strength reduction of the steering column frame resulting from the concave for the placement of the valve can be compensated, because the valve fixing member to which the valve has been fixed is fixed to the three side walls, that is, the side face of the concave, the first side wall, and any one of the third side wall and the second side wall.

The 5$^{th}$ aspect of the present invention is the working vehicle according to the 3$^{rd}$ aspect of the present invention, comprising:

a link mechanism which connects the operation lever to the valve, wherein the valve, the link mechanism, and the operation lever are assembled in a single unit as a valve unit, and the valve unit is detachably fixed to the steering column frame.

According to the working vehicle mentioned above, since the valve, the link mechanism, and the operation lever are assembled in a single unit as a valve unit, it can be easy to attach the valve unit to the steering column frame and detach the valve unit from the steering column frame.

The 6$^{th}$ aspect of the present invention is the working vehicle according to the 5$^{th}$ aspect of the present invention, wherein the link mechanism is disposed above the valve and is connected to an end portion of the operation lever, and a lower portion of the operation lever is curved in a lateral direction and penetrates a side face of a cover that covers the steering column frame.

According to the working vehicle mentioned above, the valve unit becomes a simple constitution, and a grip part of the joy-stick control lever can be disposed at the position through the shortest course, where it is easiest to be used by the operator.

Advantageous Effects of Invention

According to the present invention, it is possible to provide a working vehicle having a constitution in which it can be easy to attach and detach a valve.

PREFERRED EMBODIMENTS OF THE INVENTION

Hereinafter, an embodiment of a tractor in accordance with the present invention will be described with reference to the drawings.

Embodiment 1

Figure 1:
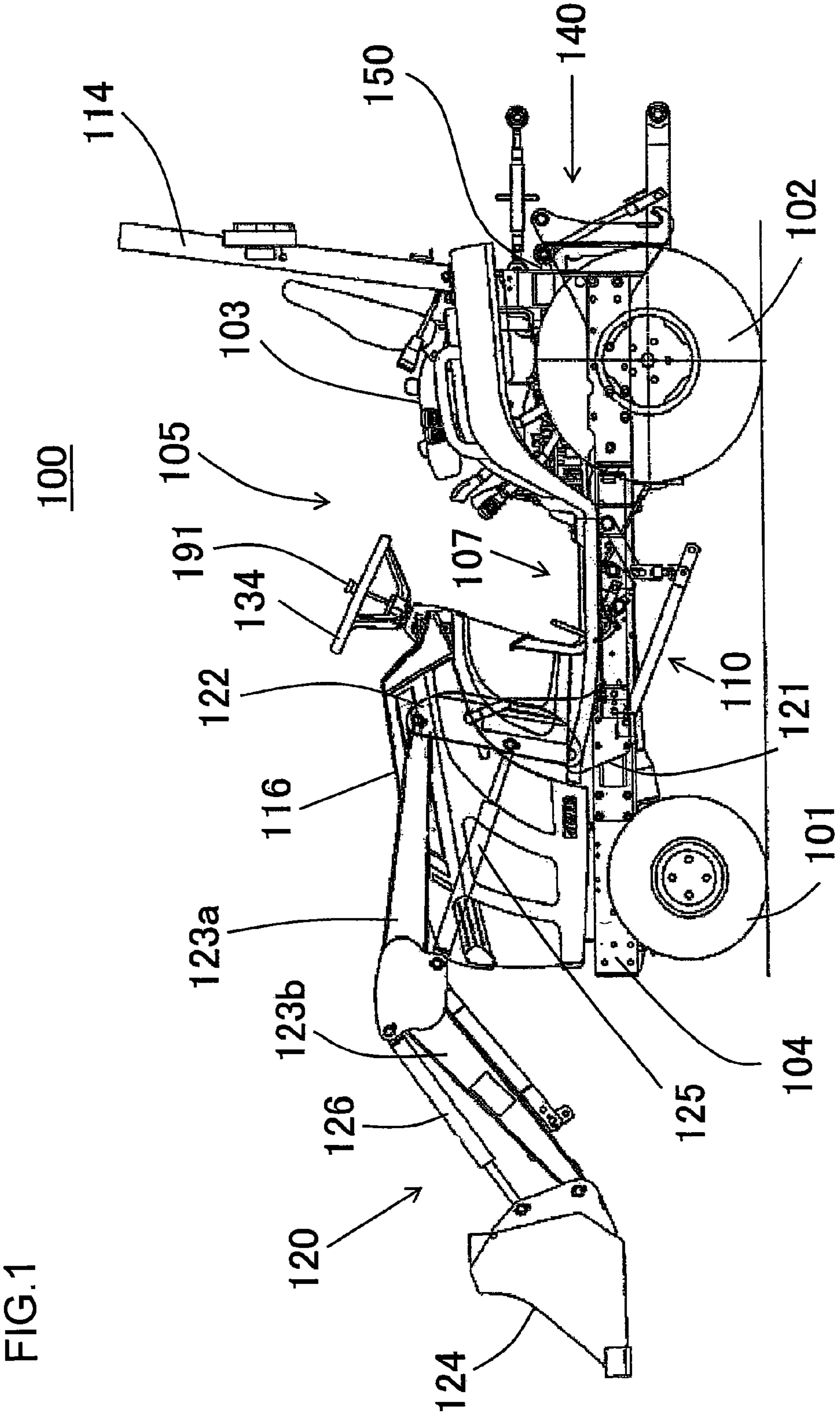
FIG. 1 is a side view illustrating a tractor, to which a front loader is attached, according to Embodiment 1 of the present invention.
Figure 2:
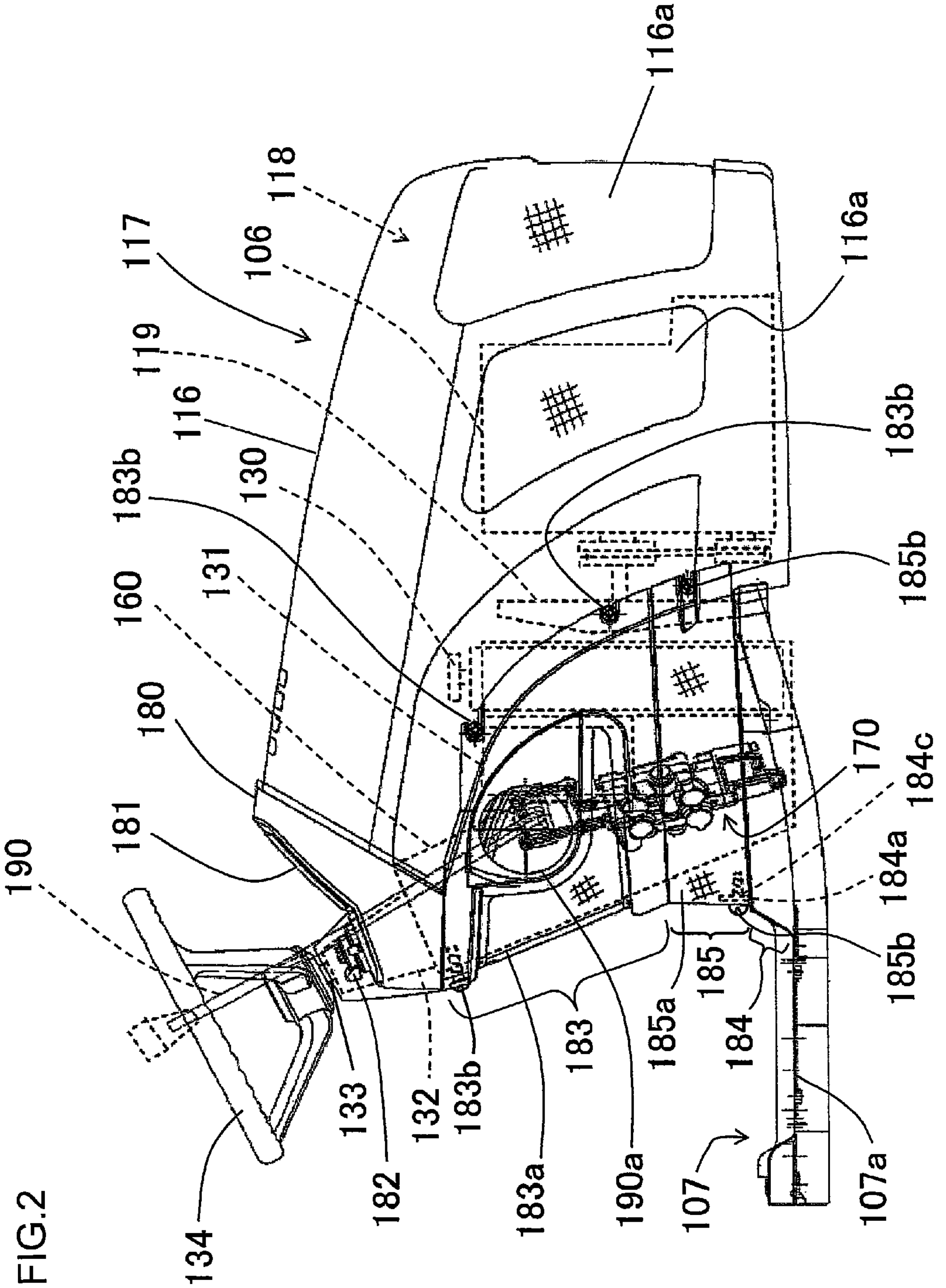
FIG. 2 is a schematic right side view illustrating a front part of a tractor body according to Embodiment 1 of the present invention.

FIG. 1 is a side view illustrating a tractor 100, to which a front loader 120 is attached, according to Embodiment 1 of the present invention, and FIG. 2 is a schematic right side view illustrating a front part of the tractor according to Embodiment 1 of the present invention.

The constitution of the tractor 100 in accordance with the present Embodiment 1 will be mainly described with reference to these drawings.

As shown in FIGS. 1 and 2, the tractor 100 of the present embodiment is provided with (i) a tractor body 105 which has a pair of right and left steerable front wheels 101 and a pair of right and left rear wheels 102, and is a four-wheel drive vehicle body constituted so as to run by itself, and (ii) a front loader 120 which is detachably connected to a front portion of the tractor body 105.

This tractor body 105 is provided with a driving force generating portion 117 (see FIG. 2) covering an engine 106 with an engine hood 116 at front portion thereof. And the tractor body 105 is provided with an operator's seat 103 above between the left and right rear wheels 102, and a roll-over protective structure 114 with a top horizontal bar and a pair of vertical support columns behind the operator's seat 103.

Further, the tractor body 105 can be provided with a mower unit (not illustrated) to be connected to the chassis 104 between the front wheels 101 and the rear wheels 102 via a link mechanism 110. In that case, a grass collecting unit (not illustrated), which can be moved in a vertical direction by a pair of right and left lift arms 150, can be detachably connected to a rear portion of the chassis 104 via a connecting mechanism 140. The grass collecting unit may not be attached to the tractor body 105 case by case.

As the implement, which is attached to the working vehicle via the connecting mechanism 140, a rotary tiller, a rear mower unit, a fertilization machine, a grader blade, a plow, subsoiler and the like can be used.

Then, an example of a working vehicle according to the present invention corresponds to the tractor body 105 of the present embodiment. An example of an implement according to the present invention corresponds to the front loader 120 of the present embodiment.

The front loader 120 is constituted from a pair of right and left support frames 122 which are detachably connected to support brackets 121 that are provided at the right and left sides of the front portion of the tractor body 105, a pair of right and left first booms 123*a* which are connected to the each upper end portion of the support frames 122 to be vertically pivotable, a pair of right and left second booms 123*b*, and a bucket 124 which is connected to the each front end portion of the right and left second booms 123*b* to be vertically rotatable.

Further, a pair of right and left lift cylinders 125 are disposed below the pair of right and left first booms 123*a*, and a pair of right and left bucket cylinders 126 are disposed above the pair of right and left second booms 123*b*.

The pair of right and left first booms 123*a* and the pair of right and left second booms 123*b* are vertically driven by the pair of right and left lift cylinders 125, and the bucket 124 is rotatively driven by the pair of right and left bucket cylinders 126.

As shown in FIG. 2, a radiator 130, an engine 106 and various apparatuses associated with it are disposed in an engine compartment 118 made of the engine hood 116.

The constitution of a front part of the tractor body 105 in accordance with the present Embodiment 1 will be further described with reference to FIGS. 2 to 8.

Figure 3:
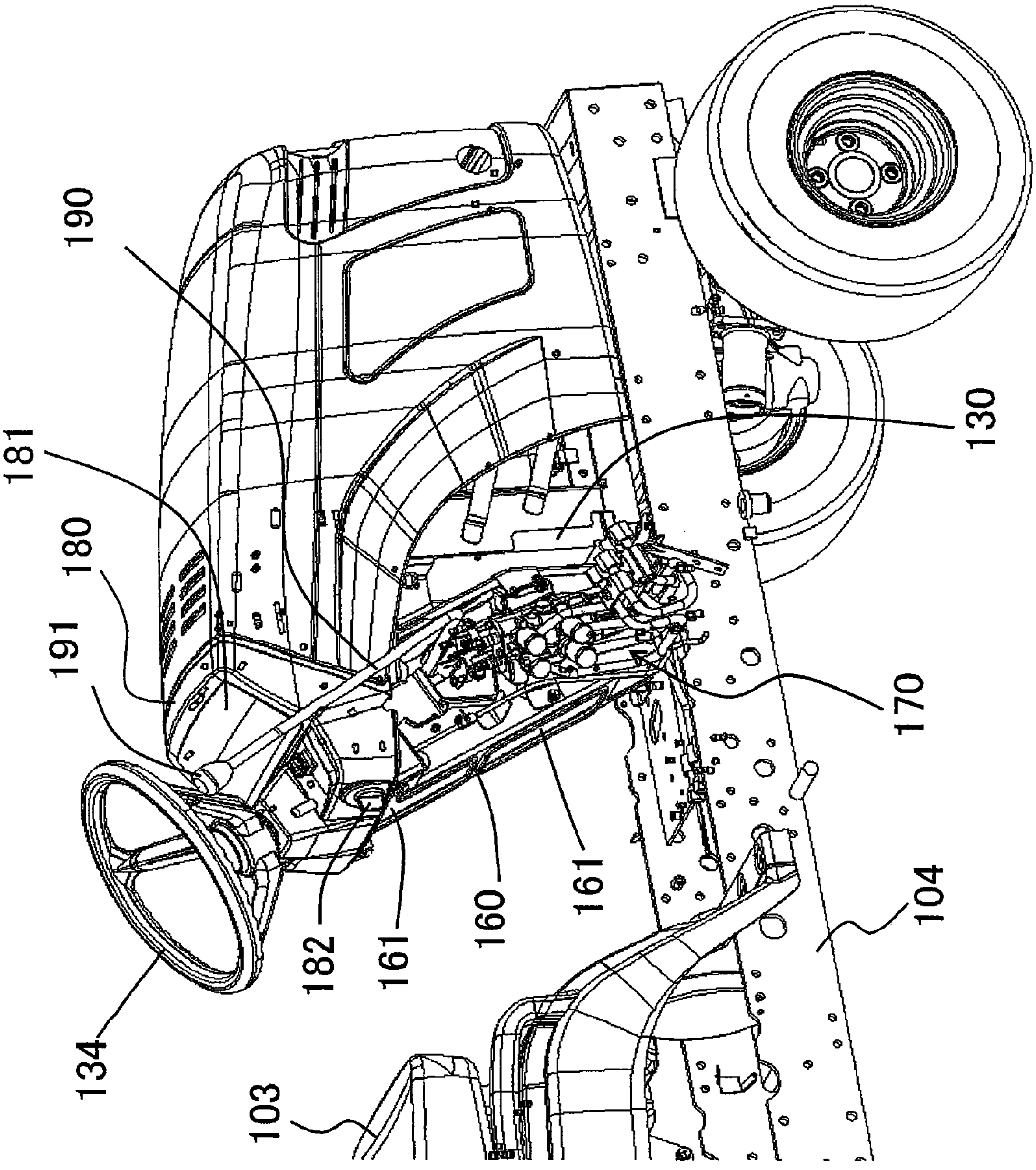
FIG. 3 is a perspective view illustrating an internal structure disposed below a steering wheel at the front part of the tractor body according to Embodiment 1 of the present invention
Figure 4:
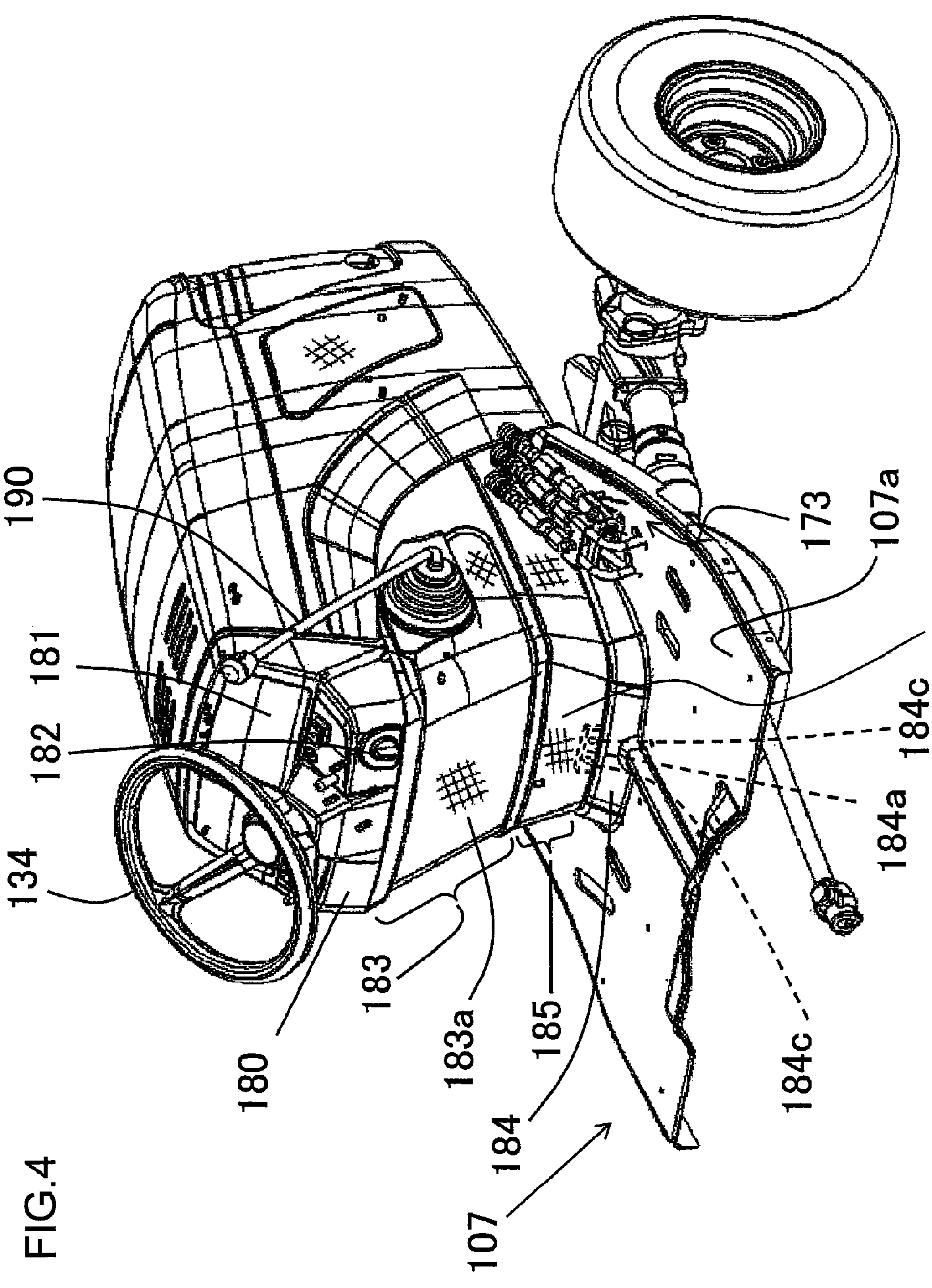
FIG. 4 is a perspective view illustrating the front part of the tractor body according to Embodiment 1 of the present invention.

FIG. 3 is a perspective view illustrating an internal structure disposed bellow a steering wheel at the front part of the tractor body 105 according to the present Embodiment 1. FIG. 4 is a perspective view illustrating the front part of the tractor body 105 according to the present Embodiment 1.

As shown in FIG. 2, a radiator fan 119 is disposed at rear portion of an engine 106, and a steering column frame 160 is disposed rear portion of the radiator fan 119 to be fixed to the chassis 104. Further; the steering column frame 160 is provided with a radiator 130, a battery 131, a valve unit 170 and the like.

Figure 5:
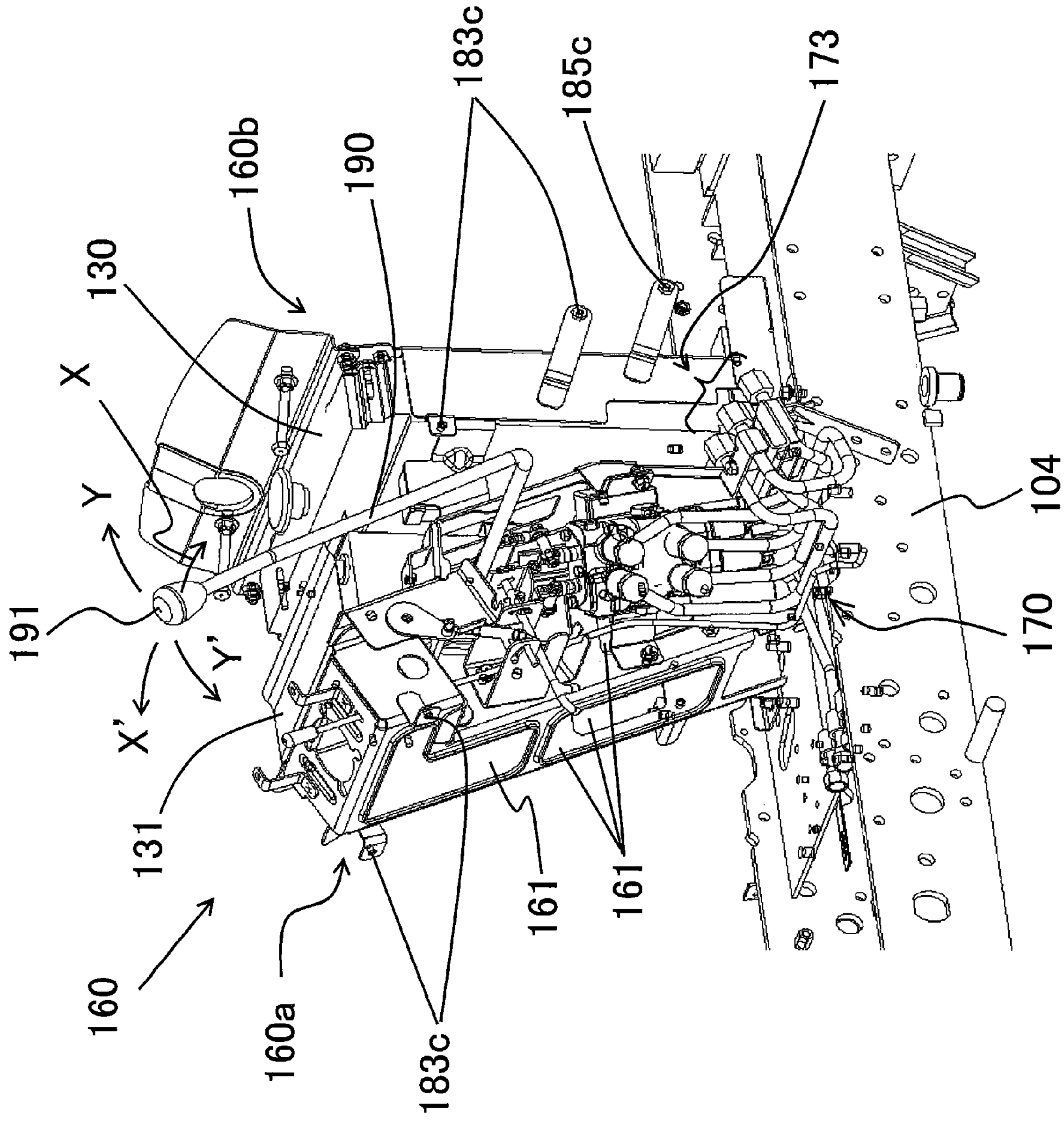
FIG. 5 is a perspective view illustrating an internal structure of the tractor body and a steering column frame provided with a radiator, a battery, a valve unit and the like, according to Embodiment 1 of the present invention.

FIG. 5 is a perspective view illustrating an internal structure of the tractor body 105 according to the present Embodiment 1 as shown in FIG. 3, and the steering column frame 160 provided with the radiator 130, the battery 131, valve unit 170 and the like.

Figure 6:
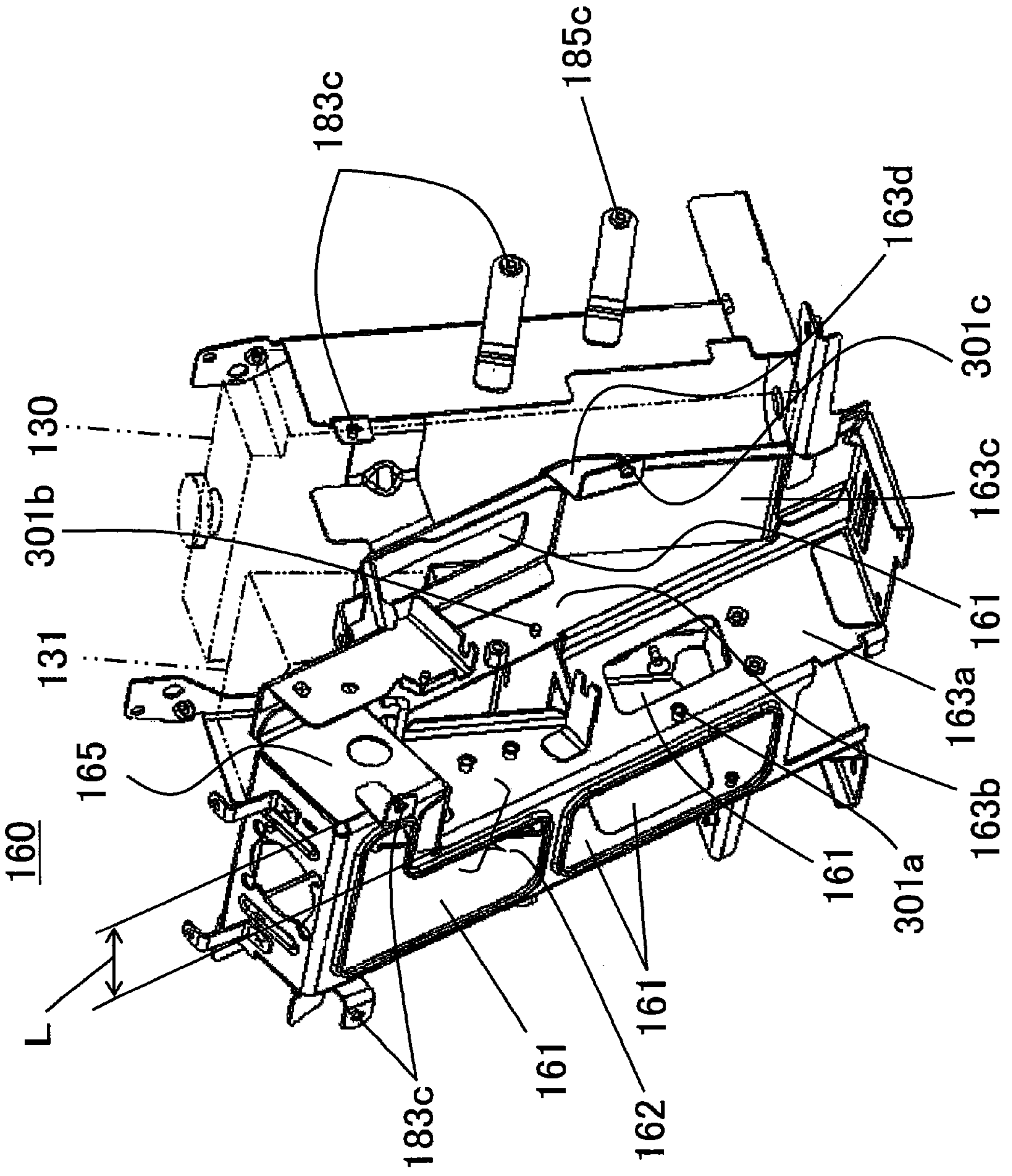
FIG. 6 is a perspective view illustrating the steering column frame according to Embodiment 1 of the present invention.

FIG. 6 is a perspective view illustrating the steering column frame 160 of the tractor body 105 according to the present Embodiment 1.

The steering column frame 160 is made with thin metal plates. Therefore, compared with the frame structure 10 made from aluminum die-casting, a weight saving of the steering column frame 160 is possible, and the cost of it can be cut down. Since the valve 171, which is required functional part, is attached to a concave part 162 (see FIG. 6) formed at the lower part of the outside face of the steering column frame 160 (see FIG. 5), the center of gravity of the steering column frame 160 lowers, and the whole steering column frame 160 becomes the stable structure body. Thereby, even if the weight saving of the steering column frame 160 is carried out, it is hard to be affected by vibration and noise, and the structural strength also improves. Incidentally, an example of a valve according to the present invention corresponds to the valve 171 of the present Embodiment 1.

As shown in FIG. 6, the steering column frame 160 has a first side wall 163*b* extending from a side face 163*a* of the concave part 162 to a front direction, a second side wall 163*c* extending from the first side wall 163*b* to a lateral direction, and a third side wall 163*d* extending from the second side wall 163*c* to a rear direction.

As shown in FIG. 6, on the steering column frame 160, the side face 163*a* of the concave part 162, the first side wall 163*b*, and the third side wall 163*d* are provided with a first fixing hole 301*a*, a second fixing hole 301*b*, and a third fixing hole 301*c*, respectively.

Figure 7:
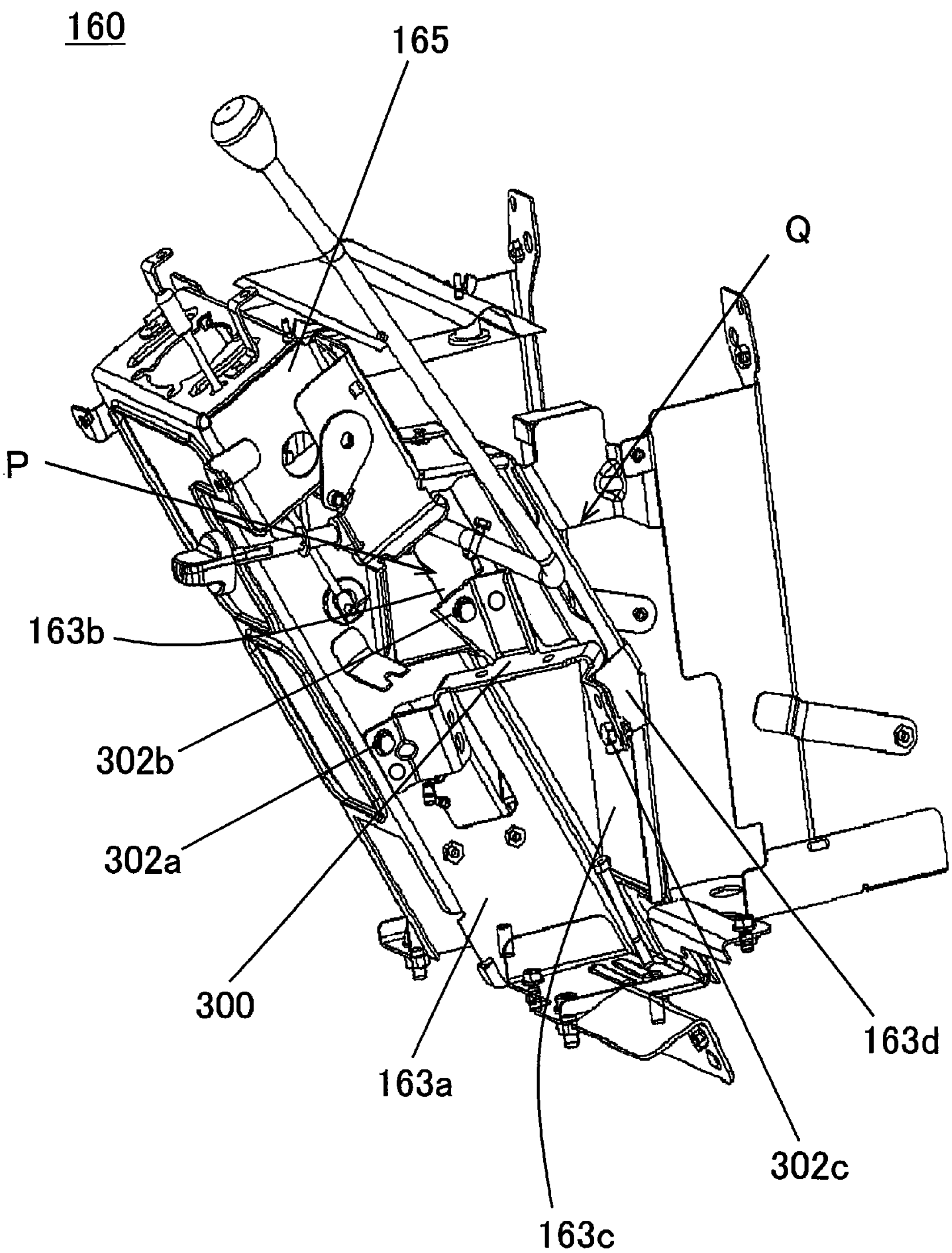
FIG. 7 is a schematic perspective view illustrating a steering column frame which is obtained by erasing a valve and so on from the steering column frame shown in FIG. 5.

As shown in FIG. 6, the valve 171 which is beforehand fixed to the bracket 300 formed by pressing a metal plate (see FIGS. 5 and 7) is fixed to the first fixing hole 301*a*, the second fixing hole 301*b*, and the third fixing hole 301*c* of the steering column frame 160 by a first bolt 302*a*, a second bolt 302*b*, and a third bolt 302*c*, respectively (see FIG. 7).

As shown in FIG. 7, since the bracket 300 to which the valve 171 has been fixed beforehand is securely connected to the side face 163*a* of the concave part 162, the first side wall 163*b*, and the third side wall 163*d* of the steering column frame 160 by the bolts, the strength reduction of the steering column frame 160 resulting from the concave part 162 for the placement of the valve 171 can be compensated. By the way, as to fixing the valve 171 to the bracket 300 will be further described blow with reference to FIGS. 9A and 9B.

FIG. 7 is a schematic perspective view illustrating the steering column frame 160 which is obtained by erasing a valve and so on from the steering column frame 160 shown in FIG. 5 in order to understand the shape of the bracket 300, and the fixing positions by the bolts easily.

Then, an example of a valve fixing member for fixing the valve according to the present invention corresponds to the bracket 300 of the present Embodiment 1.

As described above, the steering column frame 160 has a space portion as the concave part 162, which was formed by bending only length L of a lower part of the right side surface 165 of the steering column frame 160 to the left-hand side (see FIG. 6). The valve 171 (see FIG. 8) of the valve unit 170 and the link mechanism 172 are disposed in the concave part 162, thereby, it can be restrained that dimensions of the right and left width of the steering column frame 160 become longer, and a compact constitution can be obtained. Further, since the valve 171 is attached to the surface (outside face) of the steering column frame 160, it becomes easy to perform an assembling work, a maintenance check work and the like with respect to the valve 171.

Since the steering column frame 160 is provided with all of the radiator 130, the battery 131, the valve unit 170 and the like, and supports them, it is unnecessary to provide a supporting structure for only the radiator, a supporting structure for only the battery and a supporting structure for only the valve unit.

Since the battery 131 is disposed in the upper portion of the front side of the steering column frame 160, it is easy to perform the operation for attaching and detaching the battery 131 to/from the steering column frame 160 and maintenance check work of the battery 131, which includes a supply or a check of battery liquid, when the engine hood 116 is opened.

Since the radiator 130 is disposed in the front side position of the battery 131, it is easy to perform the maintenance check work of the radiator 130 as well as the battery 131, when the engine hood 116 is opened.

A hydraulic controller 132 for power steering is connected to the upper end portion of the steering column frame 160. An operation shaft 133 which extends upward from the hydraulic controller 132 is provided with a steering wheel 134 (see FIG. 2).

As shown in FIG. 2, the upper portion of the steering column frame 160 is covered by a control panel 180 which is provided with an instrument panel 181 and various switches 182, and the lower portion of the steering column frame 160 is covered by a top cover 183, a bottom cover 184 and a middle cover 185. A right side portion of the top cover 183 is provided with a through hole 190*a* for a penetrating joy-stick control lever 190 which is used when the operator controls the rising and lowering operation of the front loader 120 and the rollback and dumping operation of the bucket 124. A bottom cover 184 includes a portion standing up from a floor surface 107*a* of the lower portion of the front side of the operator's seat 103 and is a front portion of a floor part 107.

As described above, since the joy-stick control lever 190 protrudes from the through-hole 190*a* which is formed at the right side portion of the top cover 183 to the outside, a grip part 191 of the joy-stick control lever 190 can be disposed at the best position through the shortest course, where it is easiest to be used by the operator.

As shown in FIG. 2, the radiator 130 and the like which are mounted on the steering column frame 160 are covered by the top cover 183, the bottom cover 184 and the middle cover 185.

As shown in FIG. 2, the valve 171 and a link mechanism 172 (see FIG. 8) are covered by the top cover 183, the bottom cover 184 and the middle cover 185. The battery 131 is covered by the top cover 183.

The bottom cover 184 or the steering column frame 160 is provided with a fixing plate 184*a* (see FIGS. 2 and 4) having a pair of right and left second receiving holes 184*c* for fixing the middle cover 185 by screws. The fixing method of this portion can be constituted so that the middle cover 185 can be detached and attached by only a plug-type stop member other than a screw without using a tool. This matter will be further described blow with reference to FIGS. 15A to 15C.

The middle cover 185 is fixed to the steering column frame 160 and so on by screws so that it can be detached independently. To be more specific, the middle cover 185 is fixed to the pair of right and left second receiving holes 184*c* formed on the fixing plate 184*a* of the bottom cover 184 and a pair of right and left third receiving holes 185*c* (see FIG. 5) formed on the steering column frame 160 by a pair of right and left third screws 185*b* (see FIG. 2). Therefore, when the operator performs a simple check with respect to the valve 171, it is easy to detach the middle cover 185 due to its smaller size.

Figure 15A:
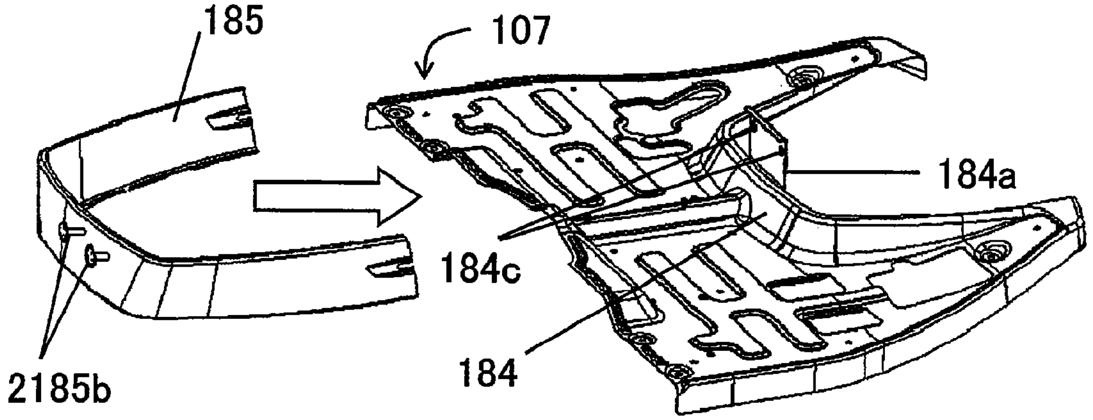
FIG. 15A is a schematic perspective view illustrating a state in which a middle cover is not yet attached to a floor part, according to a different Embodiment from the Embodiment shown in FIG. 2.
Figure 15B:
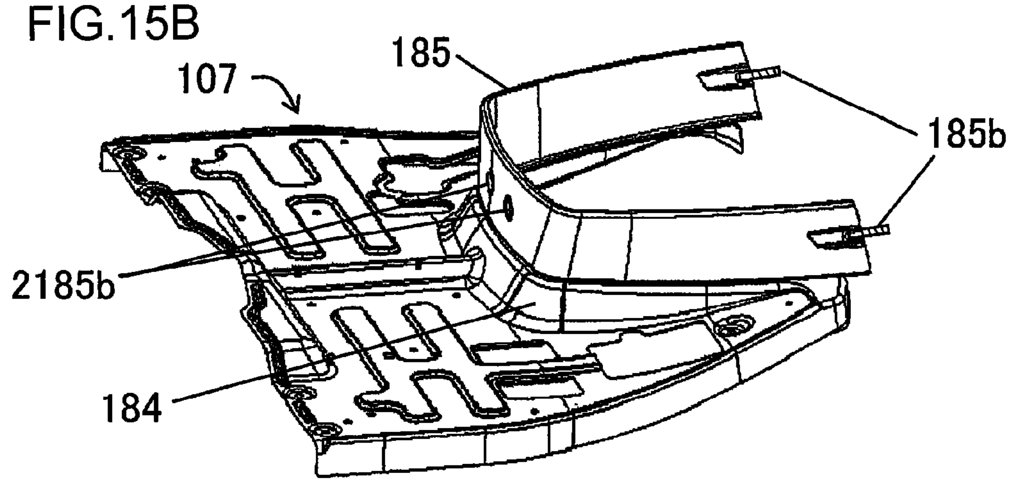
FIG. 15B is a schematic perspective view illustrating a state in which a middle cover has been attached to the floor part, according to a different Embodiment from the Embodiment shown in FIG. 2.
Figure 15C:
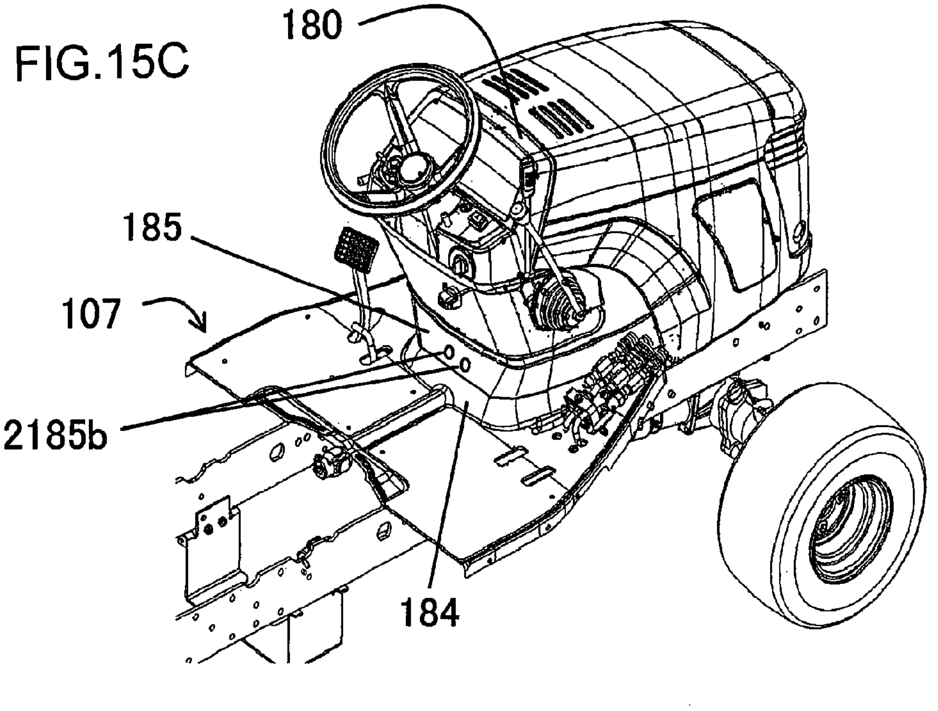
FIG. 15C is a schematic perspective view illustrating the front part of the tractor body, according to a different Embodiment from the Embodiment shown in FIG. 2.

Incidentally, as described above, regarding the fixing method of the middle cover 185 by using the pair of right and left second receiving holes 184*c*, it can be constituted so that the middle cover 185 can be detached and attached by only the plug-type stop member as shown in FIGS. 15A to 15C. Thereby, it becomes further easy to perform the operation for attaching and detaching the middle cover 185.

FIG. 15A is a schematic perspective view illustrating a state in which the middle cover 185 is not yet attached to the floor part 107, FIG. 15B is a schematic perspective view illustrating a state in which the middle cover 185 has been attached to the floor part 107, and FIG. 15C is a schematic perspective view illustrating the front part of the tractor body with the middle cover 185. FIGS. 15A to 15C show a different Embodiment from the Embodiment shown in FIG. 2.

As shown in FIG. 15A, a pair of right and left plug-type stop pins 2185*b* as an example of the plug-type stop member are fixed to the center portion of the middle cover 185. As shown in FIG. 15B, when the middle cover 185 is attached to the tractor body 105, each tip part of the pair of right and left plug-type stop pins 2185*b* is inserted in the pair of right and left second receiving holes 184*c* formed on the fixing plate 184*a*, and then the both end portions of the middle cover 185 are fixed to the pair of right and left third receiving holes 185*c* (see FIG. 5) formed on the steering column frame 160 by the third screws 185*b*.

Further, each edge portion of the inner circumference of the second receiving holes 184*c* can be covered with a rubber member. According to the above constitution, since each surface of the plug-type stop pins 2185*b* sticks to the surface of the rubber member, each position of the plug-type stop pins 2185*b* is stabilized and the vibration of the middle cover 185 can be reduced.

The top cover 183 is fixed to the steering column frame 160 by screws so that it can be detached independently. To be more specific, the top cover 183 is fixed to a pair of right and left first receiving holes 183*c* formed on a rear part frame 160*a* (see FIGS. 5 and 13) of the steering column frame 160, and to a pair of right and left first receiving holes 183*c* formed on a front part frame 160*b* (see FIGS. 5 and 13) by the first screws 183*b*, respectively.

Therefore, these first screws 183*b* are removed and then the slide movement of the top cover 183 is carried out along the direction of a standup of the joy-stick control lever 190, so that the top cover 183 can be detached.

As some examples of the detaching the top cover 183, besides the simple check of the valve 171, the cases of an exchange of the valve unit 170, a maintenance of the instrument panel 181 and the like are mentioned.

According to the above constitution, the efficiency of the simple check, the maintenance and the like improves.

Accordingly, since at least the top cover 183 and the middle cover 185 can be independently detached, respectively, when the simple check or the maintenance of the structure parts disposed below the control panel 180 is performed, the working efficiency improves by detaching of the cover with smaller size corresponding to the working.

By the way, the top cover 183 and the control panel 180 can be constituted in a single unit.

The product value of the working vehicle improves remarkably, because the link mechanism 172 (see FIG. 8) to be described later is covered with the top cover 183, so that the structure of the link mechanism does not appear on the appearance.

Further, as shown in FIG. 4, a coupler unit 173 to be described later is disposed near the right side of the middle cover 185. Therefore, if the top cover 183 and the middle cover 185 are formed in a single unit, it is difficult to detach the cover which is formed as the single unit structure and is penetrated by the joy-stick control lever 190, unless the coupler unit 173 is removed. However, according to the present embodiment, since the top cover 183 and the middle cover 185 are not formed as a single unit structure, that is they are independent constitution each other, it is possible to remove the top cover 183 penetrated by the joy-stick control lever 190 even if the coupler unit 173 is not removed.

Incidentally, as described above, the bottom cover 184 is a part of the floor part 107. Therefore, it is necessary to remove the whole of the floor part 107 fixed to the chassis 104 by screws in order to remove the bottom cover 184. Therefore, the floor part 107 including the bottom cover 184 may be removed to do the required work.

Accordingly, as shown in FIGS. 3 and 4, the valve 171 and the link mechanism 172 (see FIG. 8) can be seen by detaching all of the top cover 183, the bottom cover 184, and the middle cover 185. Therefore, when the check, repair, or exchange of at least the valve 171 and the link mechanism 172 are carried out, or the exchange of the whole of the valve unit 170 is carried out, it is easy to detach and attach these parts from and to the tractor body 105.

As shown in FIG. 2, a first ventilation opening 183*a* and a third ventilation opening 185*a* having a structure for blocking dust are formed in the top cover 183 and the middle cover 185, respectively. The outside air which has been introduced through the first ventilation opening 183*a* and the third ventilation opening 185*a*, is sucked in by a radiator fan 119 through the ventilation openings 161 etc. and is guided to the radiator 130, and then the air flows forward in the engine compartment 118, and as a result, the heat within the engine compartment 118 is discharged to the outside through ventilation openings 116*a* in the front face and lateral fore portions of the engine hood 116.

Accordingly, it becomes possible to suck in a lot of outside air most efficiently for cooling the radiator through the ventilation opening. Further, since the ventilation openings 161 are formed near the valve 171 and the link mechanism 172, the cooling efficiency of the valve unit 170 improves.

As shown in FIG. 5, the valve unit 170 disposed at the lower portion of the right side of the steering column frame 160 is constituted so that the piping connection with the lift cylinder 125 and the bucket cylinder 126 via the coupler unit 173 can be carried out.

As described above, since the radiator 130, the battery 131, the valve unit 170 and the like are held by the steering column frame 160, the tractor body 105 of the present embodiment can have more functions by fewer constitution parts.

Figure 13:
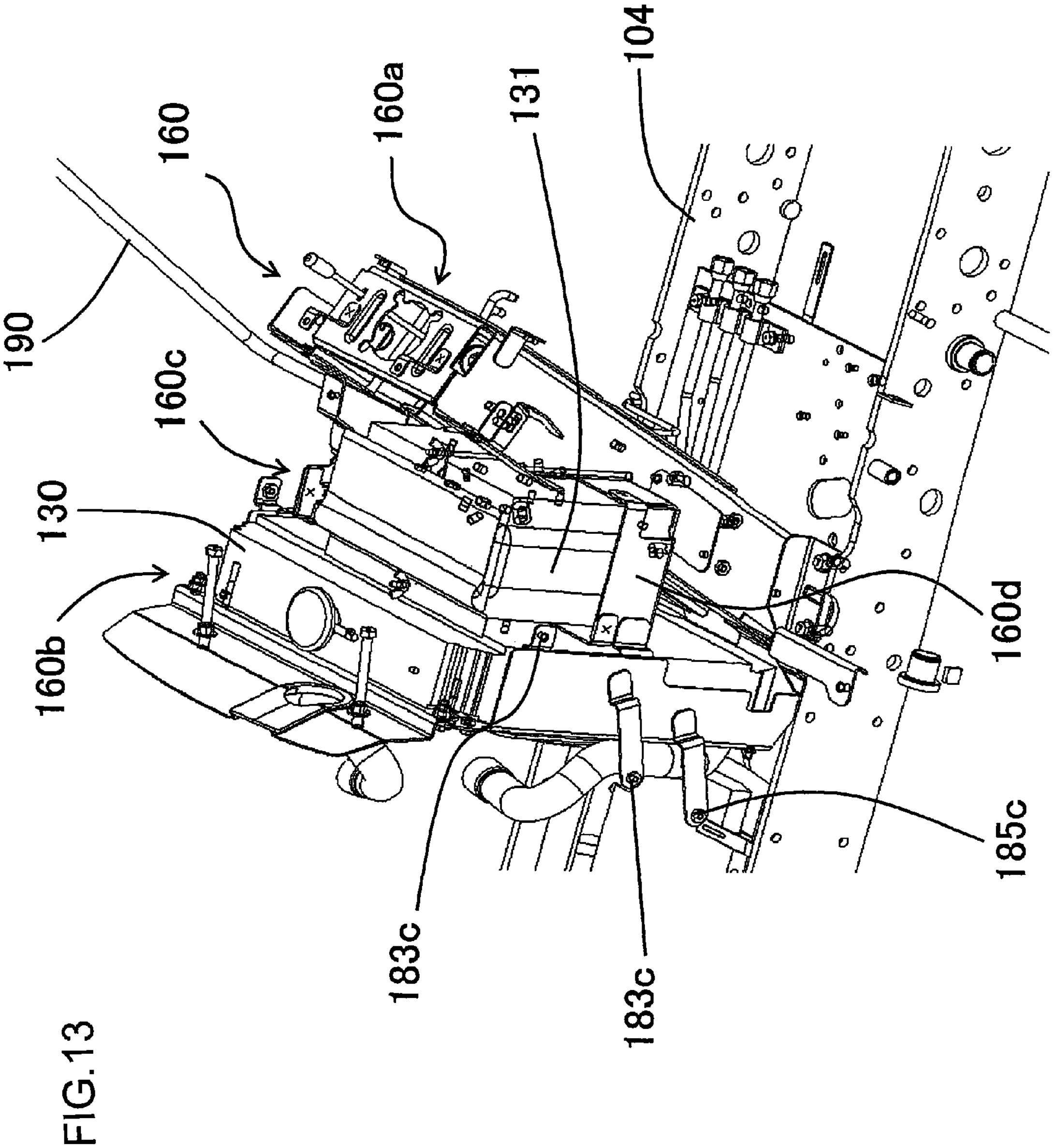
FIG. 13 is a perspective view illustrating the internal structure of the tractor body which is shown in FIG. 5 and is seen from still another direction, according to Embodiment 1 of the present invention.

As shown in FIG. 13, the steering column frame 160 comprises a rear part frame 160*a* supporting the steering wheel 134 mainly, a front part frame 160*b* supporting the radiator 130, and a middle part frame 160*c* supporting the battery 131. The middle part frame 160*c* has a constitution for connecting the rear part frame 160*a* and the front part frame 160*b* each other, and is provided with a battery holder 160*d*.

By the way, an example of an operation lever according to the present invention corresponds to the joy-stick control lever 190 of the present embodiment.

Figure 8:
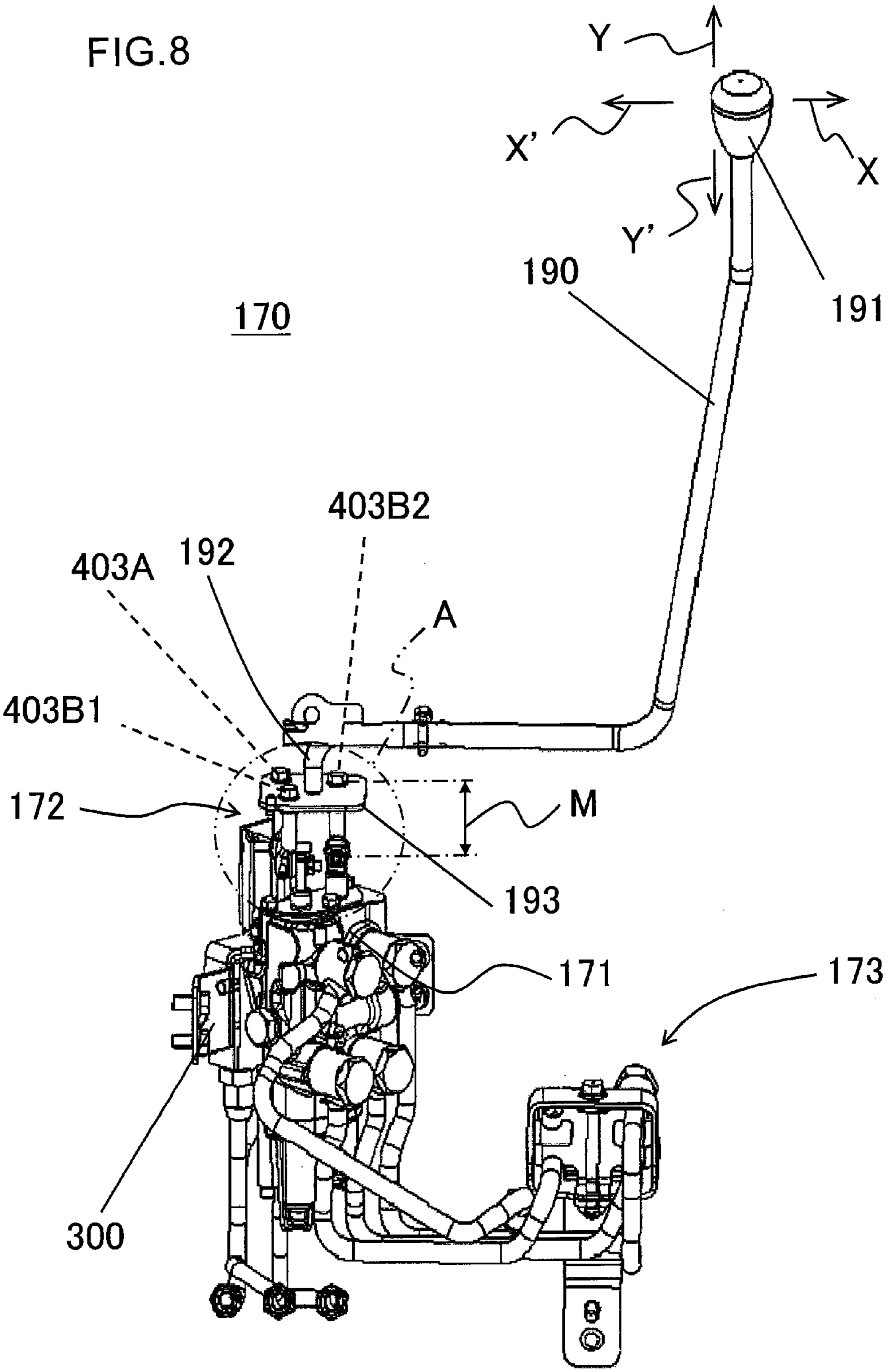
FIG. 8 is a perspective view illustrating a valve unit according to Embodiment 1 of the present invention.

Next, constitution of the valve unit 170 will be described with reference to FIGS. 8 to 10A. FIG. 8 is a perspective view illustrating a valve unit 170 of the tractor body 105 of the present embodiment. Each of FIGS. 9A and 9B is a perspective view illustrating a situation that the valve 171 is fixed to the bracket 300, according to the present Embodiment 1.

As shown in FIG. 8, the valve unit 170 comprises the valve 171, the joy-stick control lever 190, the link mechanism 172 which transmits the movement of the joy-stick control lever 190 to the valve 171, the coupler unit 173 including the piping parts, and the like.

The link mechanism 172 is disposed over the valve 171. An end portion 192 (see FIG. 8) of the joy-stick control lever 190 is connected to the link mechanism 172 via an operation plate 193. A lower portion of the joy-stick control lever 190 is curved in a lateral direction and penetrates the right side face of the top cover 183 that covers the steering column frame 160 (see FIG. 4).

Figure 9B:
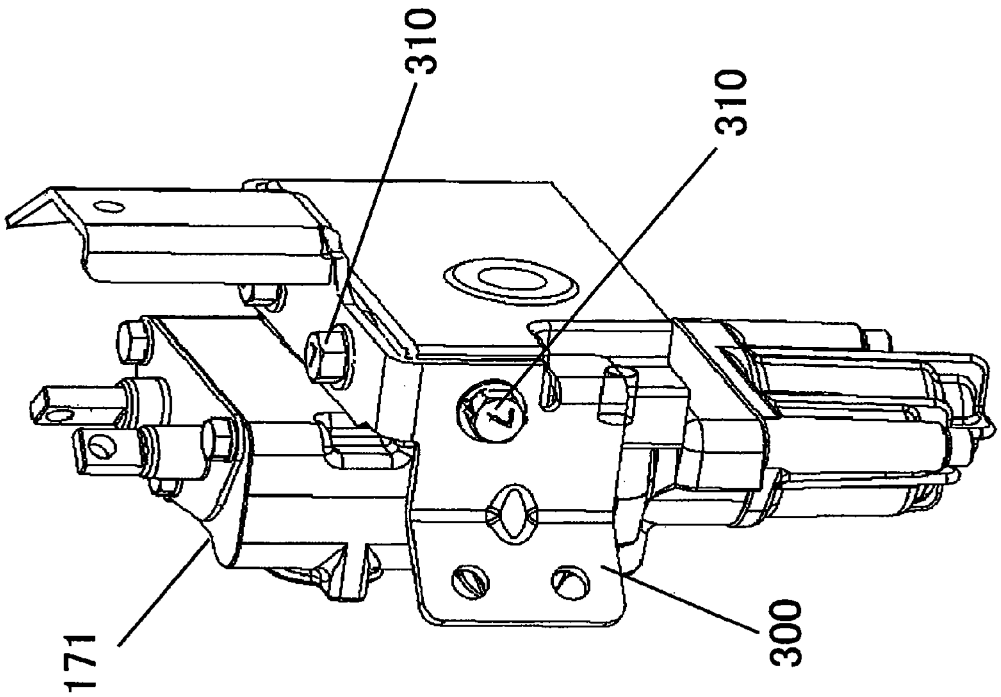
FIG. 9B is a perspective view illustrating a situation that a valve is fixed to a bracket, according to Embodiment 1 of the present invention.
Figure 9A:
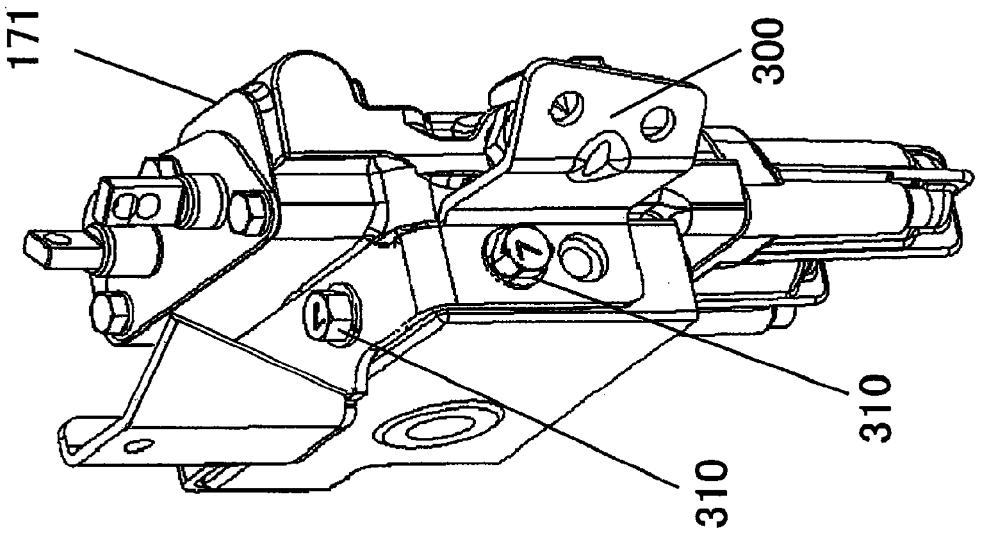
FIG. 9A is a perspective view illustrating a situation that a valve is fixed to a bracket, according to Embodiment 1 of the present invention.

As shown in FIGS. 9A and 9B, the valve 171 is fixed to the bracket 300 by fixing bolts 310. FIG. 9A is a perspective view illustrating a situation that the valve 171 is seen from the direction of arrow P as shown in FIG. 7, and FIG. 9B is a perspective view illustrating a situation that the valve 171 is seen from the direction of arrow Q as shown in FIG. 7

As shown in FIGS. 9A and 9B, since the valve 171 is fixed to the bracket 300 by fixing bolts 310 which are directed in the three directions, the wobble between both parts is minimized, and the valve 171 can be fixed more strongly to the bracket 300.

Figure 10A:
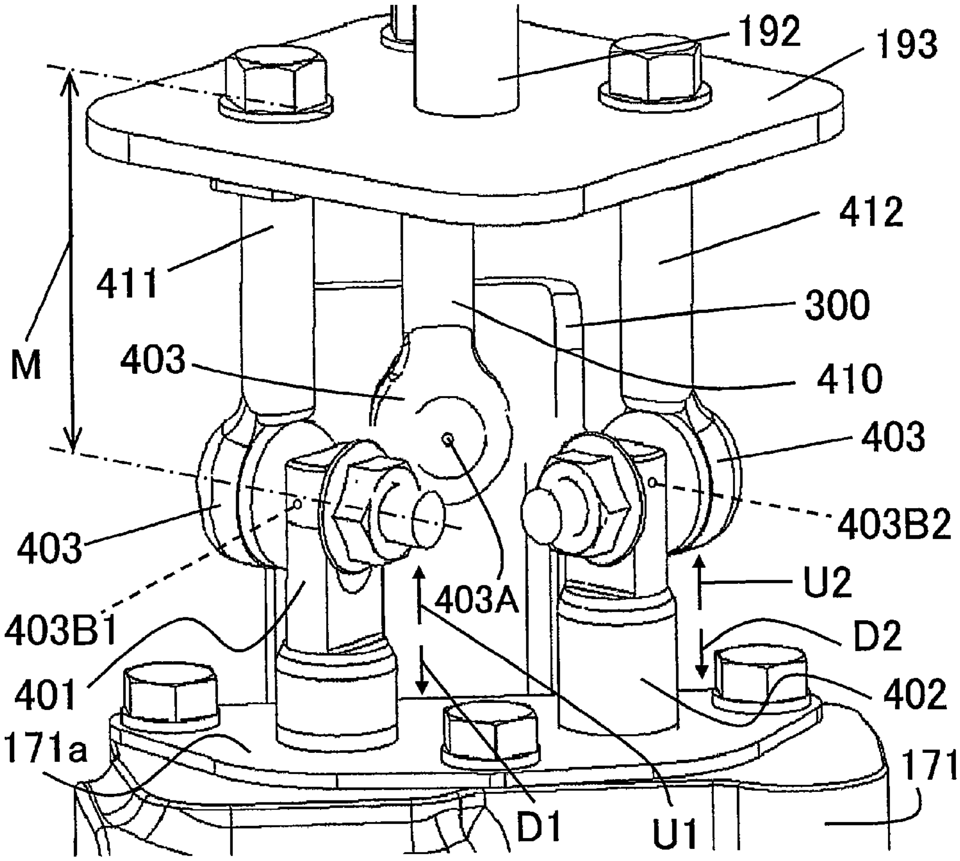
FIG. 10A is an enlarged perspective view illustrating a link mechanism of the valve unit, according to Embodiment 1 of the present invention.

As shown in FIG. 10A, the valve 171 is provided with a first spool 401 and a second spool 402 which can slide vertically on the upper end portion 171*a* thereof. The first spool 401 can be slid vertically to select a state of extension or a state of retraction of the lift cylinder 125 (see FIG. 1), and the second spool 402 can be slid vertically to select a state of extension or a state of retraction of the bucket cylinder 126 (see FIG. 1)

Figure 10B:
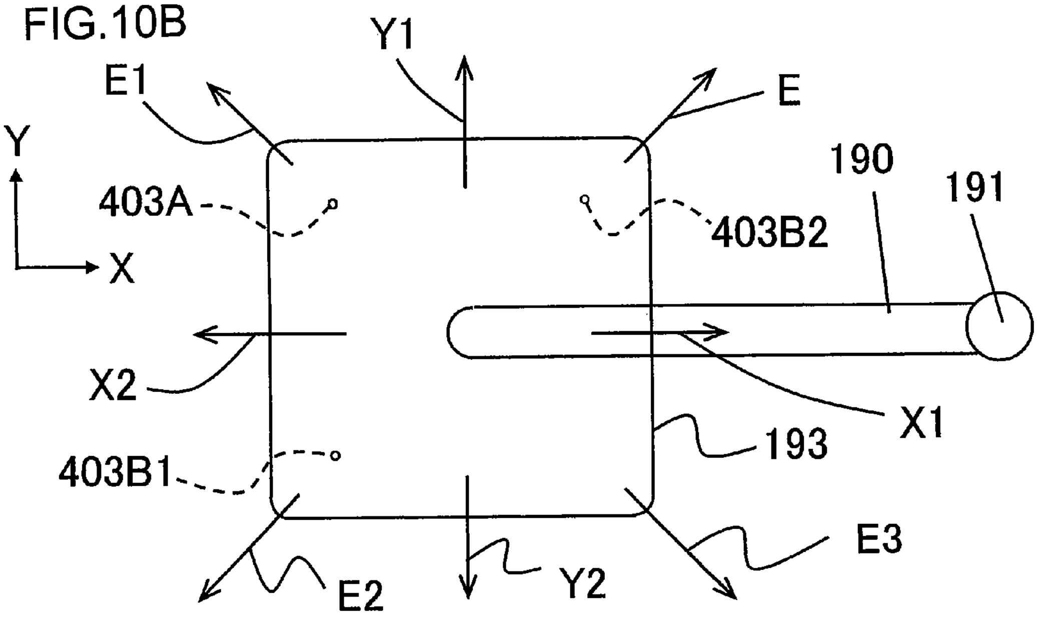
FIG. 10B is a schematic plan view illustrating an operation plate for explaining a relation between a motion of a joy-stick control lever and motions of a front loader and a bucket, according to Embodiment 1 of the present invention.

FIG. 10A is an enlarged perspective view illustrating the link mechanism 172 of the valve unit 170 surrounded with a circle A denoted by a two-dot chain line in FIG. 8, according to the present Embodiment 1, and FIG. 10B is a schematic plan view illustrating the operation plate 193 for explaining a relation between a motion of the joy-stick control lever 190 and motions of the front loader 120 and the bucket 124, according to the present Embodiment 1.

As shown in FIG. 10A, the operation plate 193 is connected to the bracket 300 through a supporting rod 410 provided with a universal joint 403 at the tip thereof in such a manner that the connection angle between both can be changed freely. Further, the operation plate 193 is connected to the first spool 401 through a first rod 411 provided with a universal joint 403 at the tip thereof in such a manner that the connection angle between both can be changed freely, and is connected to the second spool 402 through a second rod 412 provided with a universal joint 403 at the tip thereof in such a manner that the connection angle between both can be changed freely.

As shown in FIG. 10A, a fulcrum 403A denotes a central point of operation of the universal joint 403 of the supporting rod 410, a first fulcrum 403B1 denotes a central point of operation of the universal joint 403 of the first rod 411, and a second fulcrum 403B2 denotes a central point of operation of the universal joint 403 of the second rod 412.

Incidentally, as some examples of the universal joint 403, a spherical joint, a ball joint, and the like are mentioned.

As is apparent from the above description, the link mechanism 172 is configured in such a manner that a rod length M (see FIG. 10A) of the link mechanism 172 can become minimal. In the case that the rod length M is long, the movement of the joy-stick control lever 190 is hard to be transmitted to the valve 171 precisely because of influence of the bend of the link rods. However, according to the configuration of the present Embodiment 1, the movement of the joy-stick control lever 190 can be transmitted to the valve 171 precisely.

According to the configuration mentioned above, the valve unit 170 becomes a simple configuration, and a grip part 191 of the joy-stick control lever 190 can be disposed at the position through the shortest course, where it is easiest to be used by the operator.

According to the configuration mentioned above, since the valve 171, the link mechanism 172, and the joy-stick control lever 190 are assembled in a single unit as a valve unit 170, it can be easy to attach the valve unit 170 to the steering column frame 160 and detach the valve unit 170 from the steering column frame 160.

According to the above described constitution, the joy-stick control lever 190 can be connected to the valve 171 by using the more simple constitution of the link mechanism 172.

Further, since the valve 171, the joy-stick control lever 190, the link mechanism 172 connecting them, and the coupler unit 173 are constituted as a single unit, it becomes possible to assemble the valve unit 170 beforehand in another manufacturing process, and then the increase in efficiency of the assembly process and improvement in quality can be achieved.

Next, the relation between a motion of a joy-stick control lever 190 and motions of the front loader 120 and the bucket 124, according to the present Embodiment 1, will be described with reference to FIGS. 10A, 10B, and FIGS. 11A to 11C.

Figures 11A, 11B, 11C:
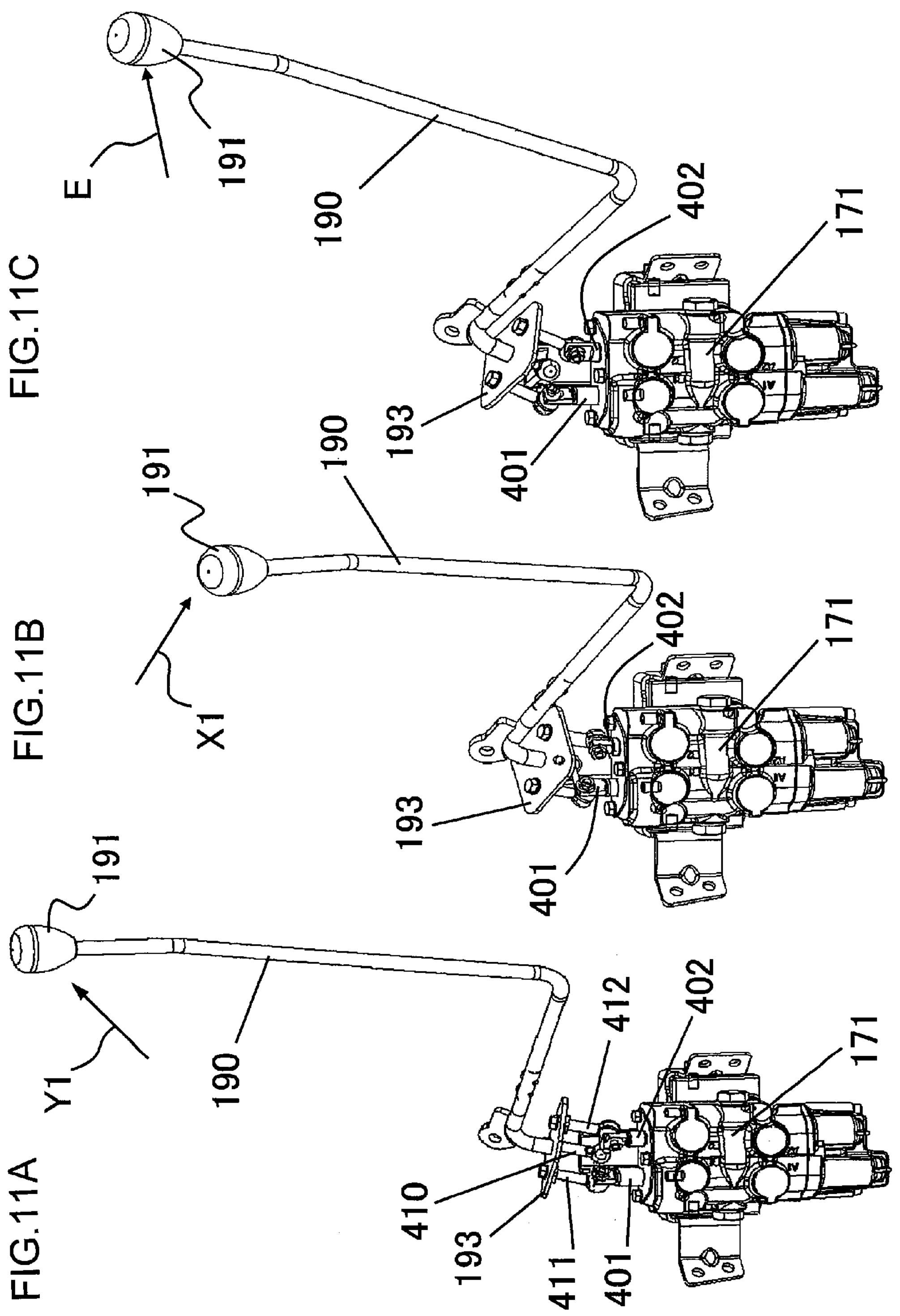
FIG. 11A is a perspective view illustrating a motion of the link mechanism corresponding to the motion of the joy-stick control lever, according to Embodiment 1 of the present invention.
FIG. 11B is a perspective view illustrating a motion of the link mechanism corresponding to the motion of the joy-stick control lever, according to Embodiment 1 of the present invention.
FIG. 11C is a perspective view illustrating a motion of the link mechanism corresponding to the motion of the joy-stick control lever, according to Embodiment 1 of the present invention.

Each one of FIGS. 11A to 11C is a perspective view illustrating a motion of the link mechanism 172 corresponding to the motion of the joy-stick control lever 190, according to the present Embodiment 1.

Incidentally, FIG. 10A denotes a state of the link mechanism 172 in case that the joy-stick control lever 190 is located in an intermediate position.

When the operator moves the joy-stick control lever 190 in a lengthwise direction of the tractor body 105 (see arrows Y and Y' shown in FIG. 8), the lift cylinder 125 expands or contracts, so that the rising and lowering operation of the front loader 120 is performed. Further, when the operator moves the joy-stick control lever 190 in a right-left side direction of the tractor body 105 (see arrows X and X' shown in FIG. 8), the bucket cylinder 126 expands or contracts, so that the rollback and dumping operation of the bucket 124 is performed.

Next, the operation of the configuration described above will be described with reference to FIGS. 10A, 10B, and FIGS. 11A to 11C.

First of all, as shown in FIG. 10B, the case that the operator moves the joy-stick control lever 190 in the direction of arrow Y1 from the intermediate position (see FIG. 10A) will be described (see FIG. 11A).

In this case, the fulcrum 403A and the second fulcrum 403B2 do not move vertically and the first fulcrum 403B1 is moved in the direction of arrow U1 (see FIG. 10A). And as a result, the lift cylinder 125 (see FIG. 1) retracts and then the front loader 120 is lowered.

Further, the case that the operator moves the joy-stick control lever 190 in the direction of arrow Y2 from the intermediate position (see FIG. 10A) will be described (see FIG. 10B).

In this case, the fulcrum 403A and the second fulcrum 403B2 do not move vertically and the first fulcrum 403B1 is moved in the direction of arrow D1 (see FIG. 10A). And as a result, the lift cylinder 125 (see FIG. 1) extends and then the front loader 120 is lifted.

Next, the case that the operator moves the joy-stick control lever 190 in the direction of arrow X1 from the intermediate position (see FIG. 10A) will be described (see FIG. 11B).

In this case, the fulcrum 403A and the first fulcrum 403B1 do not move vertically and the second fulcrum 403B2 is moved in the direction of arrow D2 (see FIG. 10A). And as a result, the bucket cylinder 126 (see FIG. 1) extends and then the bucket 124 is rotated downward.

Further, the case that the operator moves the joy-stick control lever 190 in the direction of arrow X2 from the intermediate position (see FIG. 10A) will be described (see FIG. 10B).

In this case, the fulcrum 403A and the first fulcrum 403B1 do not move vertically and the second fulcrum 403B2 is moved in the direction of arrow U2 (see FIG. 10A). And as a result, the bucket cylinder 126 (see FIG. 1) retracts and then the bucket 124 is rotated upward.

Next, the case that the operator moves the joy-stick control lever 190 in the direction of arrow E from the intermediate position (see FIG. 10A) will be described (see FIG. 11C).

In this case, the fulcrum 403A does not move vertically, and the first fulcrum 403B1 is moved in the direction of arrow U1 (see FIG. 10A) and the second fulcrum 403B2 is moved in the direction of arrow D2 (see FIG. 10A). And as a result, the lift cylinder 125 (see FIG. 1) retracts and then the front loader 120 is lowered, and the bucket cylinder 126 (see FIG. 1) extends and then the bucket 124 is rotated downward.

Next, the cases that the operator moves the joy-stick control lever 190 in the direction of arrow E1, in the direction of arrow E2, and in the direction of arrow E3, respectively from the intermediate position (see FIG. 10A) will be described (see FIG. 10B).

When the operator moves the joy-stick control lever 190 in the direction of arrow E1 from the intermediate position (see FIG. 10A), the front loader 120 is lowered and the bucket 124 is rotated upward. When the operator moves the joy-stick control lever 190 in the direction of arrow E2 from the intermediate position (see FIG. 10A), the front loader 120 is lifted and the bucket 124 is rotated upward. When the operator moves the joy-stick control lever 190 in the direction of arrow E3 from the intermediate position (see FIG. 10A), the front loader 120 is lifted and the bucket 124 is rotated downward.

Further, the link mechanism 172 is constituted in such a manner that the joy-stick control lever is movable between the directions of the arrow X1, X2, Y1, Y2, E, E1, E2 and E3, even if the joy-stick control lever 190 is not returned to the intermediate position (see FIG. 10A).

As is apparent from the above description, it is possible to perform easily the independent movement (see FIGS. 11A and 11B) of the first spool 401 and the second spool 402 in the vertical direction (see arrows U1, D1, U2 and D2 in FIG. 10A), and the compound movement (see FIG. 11C) of the first spool 401 and the second spool 402 in the vertical direction, in accordance with the movement in all the directions of the joy-stick control lever 190.

The various electric wiring (not illustrated) stored in the protection tube (not illustrated) is located by effectively using space in the steering column frame 160 provided with the battery 131, valve unit 170 and the like.

Figure 12:
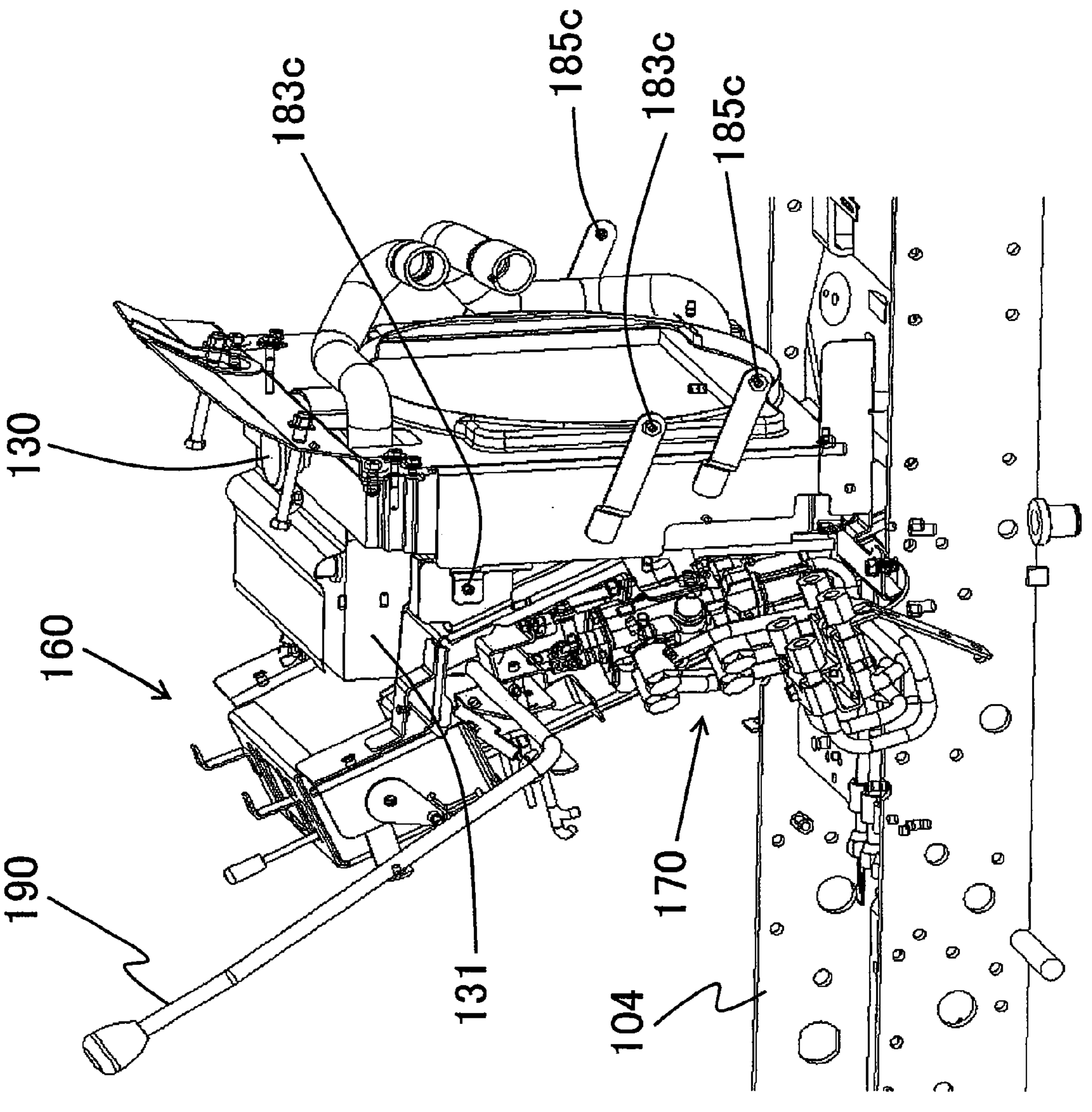
FIG. 12 is a perspective view illustrating the internal structure of the tractor body which is shown in FIG. 5 and is seen from another direction, according to Embodiment 1 of the present invention.
Figure 14:
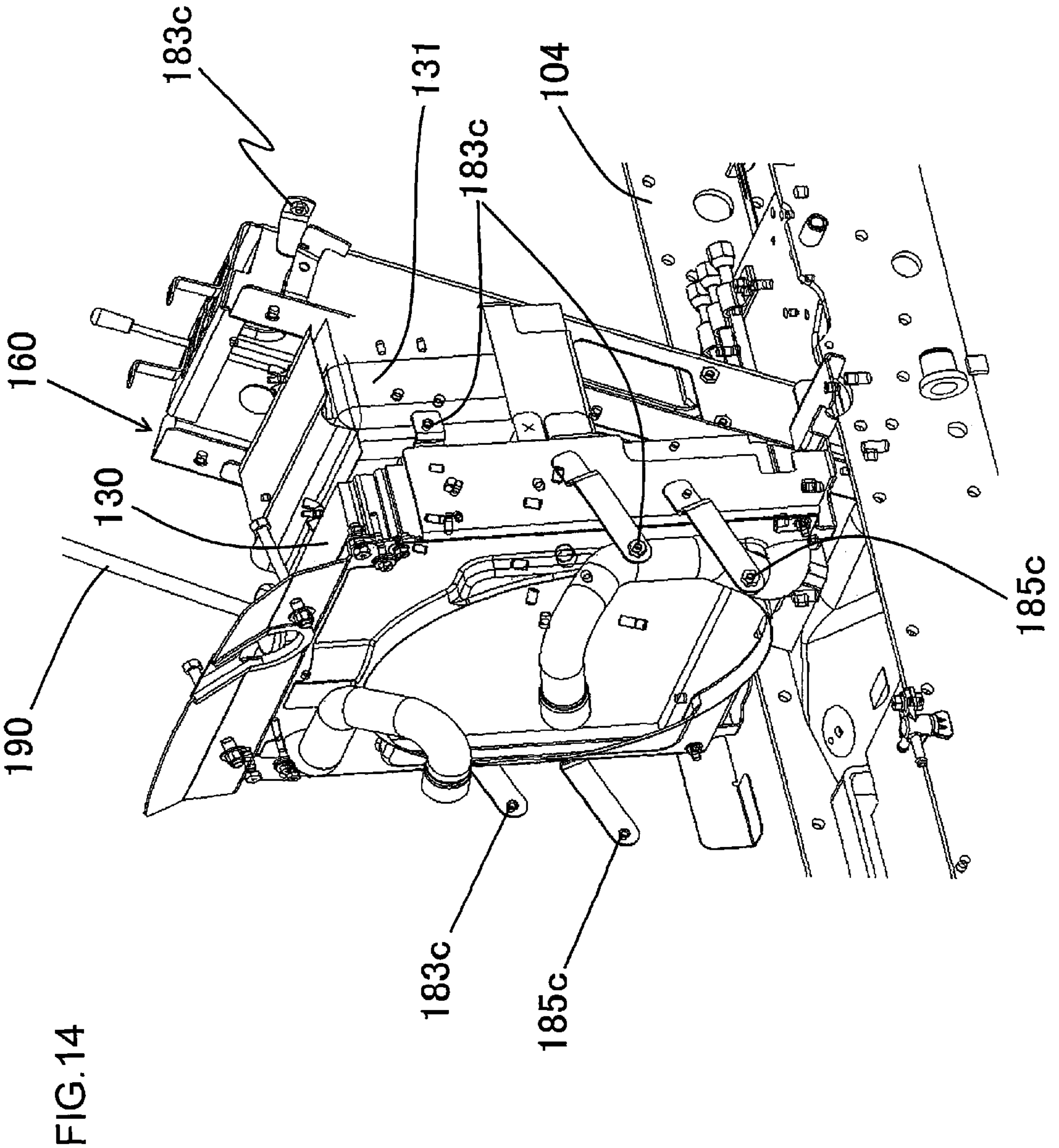
FIG. 14 is a perspective view illustrating the internal structure of the tractor body which is shown in FIG. 5 and is seen from further still another direction, according to Embodiment 1 of the present invention.

By the way, FIGS. 12 to 14 are perspective views illustrating the internal structure of the tractor body 105 which is shown in FIG. 5 and is seen from another direction, according to Embodiment 1 of the present invention. Therefore, in these figures, the same reference signs are used for the constructional parts which are the same as the constructional parts described above.

In the case of the embodiment described above, it has been described that the floor part 107 (see FIG. 15A) can not be divided into a right side part and a left side part. However, the invention described in this specification is not limited to this constitution. For instance, the third divisible floor 1107 may be divided into a right side part and a left side part. In this case, the left side part 1107*a* and the right side part 1107*b* are connected by bolts 1108 and nuts 1109 when these parts are assembled.

Figure 16A:
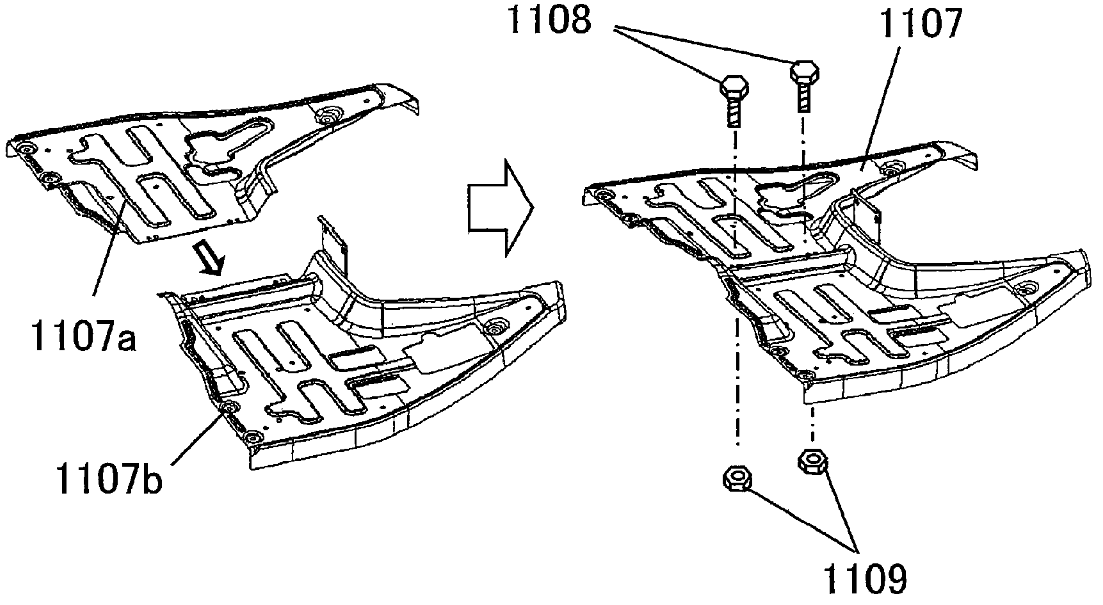
FIG. 16A is a perspective view illustrating a third floor part which can be divided into a right side part and a left side part.
Figure 16B:
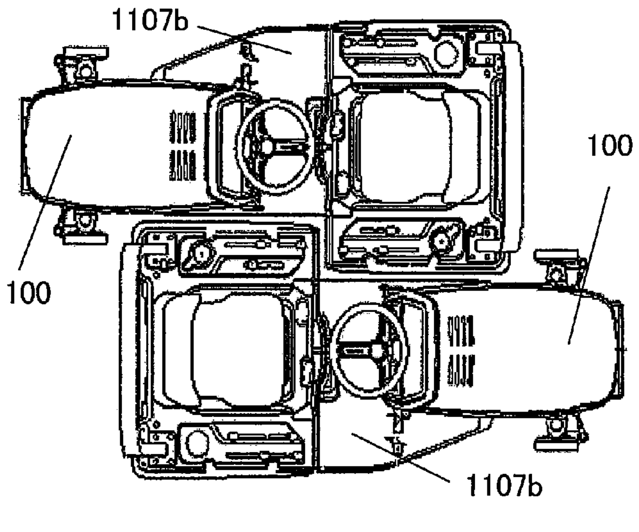
FIG. 16B is a schematic plan view illustrating a situation of loading a container with the tractor.

According to the configuration described above, when the tractors 100 are loaded into the container and are conveyed, it is possible to arrange these tractors 100 without the left side part 1107*a* of the third divisible floor 1107. Therefore, as shown in FIG. 16B, these tractors 100 can be shipped without a useless space arising in the container. Accordingly, more tractors 100 can be loaded into one container compared with the conventional tractor, and then it is effective in reduction of conveyance expense. FIG. 16A is a perspective view illustrating the third divisible floor 1107 which can be divided into a right side part and a left side part. FIG. 16B is a schematic plan view illustrating a situation of loading a container with the tractor 100.

In the case of the above described embodiments, it has been described that cover unit disposed below the control panel is constituted from the top cover 183, the bottom cover 184, and the middle cover 185. However, the present invention described in this specification is not limited to this constitution. For instance, as shown in FIGS. 17 and 18, the cover unit disposed in space between the control panel 180 and a second floor part 2107 can be constituted from an upper side cover 2183 and a lower side cover 2186.

Figure 17:
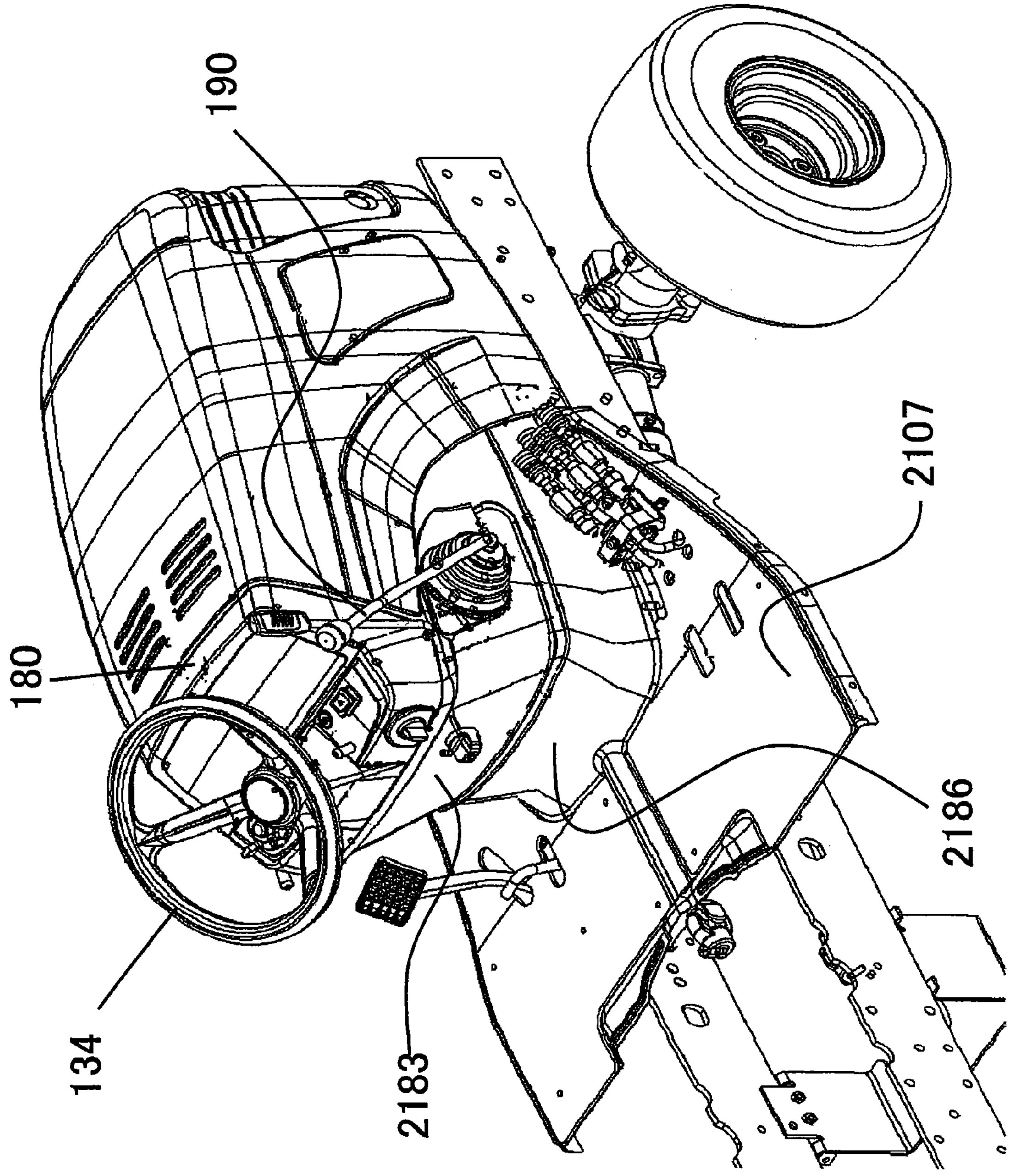
FIG. 17 is a perspective view illustrating the front part of the tractor body for explaining an upper cover and a lower cover, according to a different Embodiment from the Embodiment shown in FIG. 2.
Figure 18:
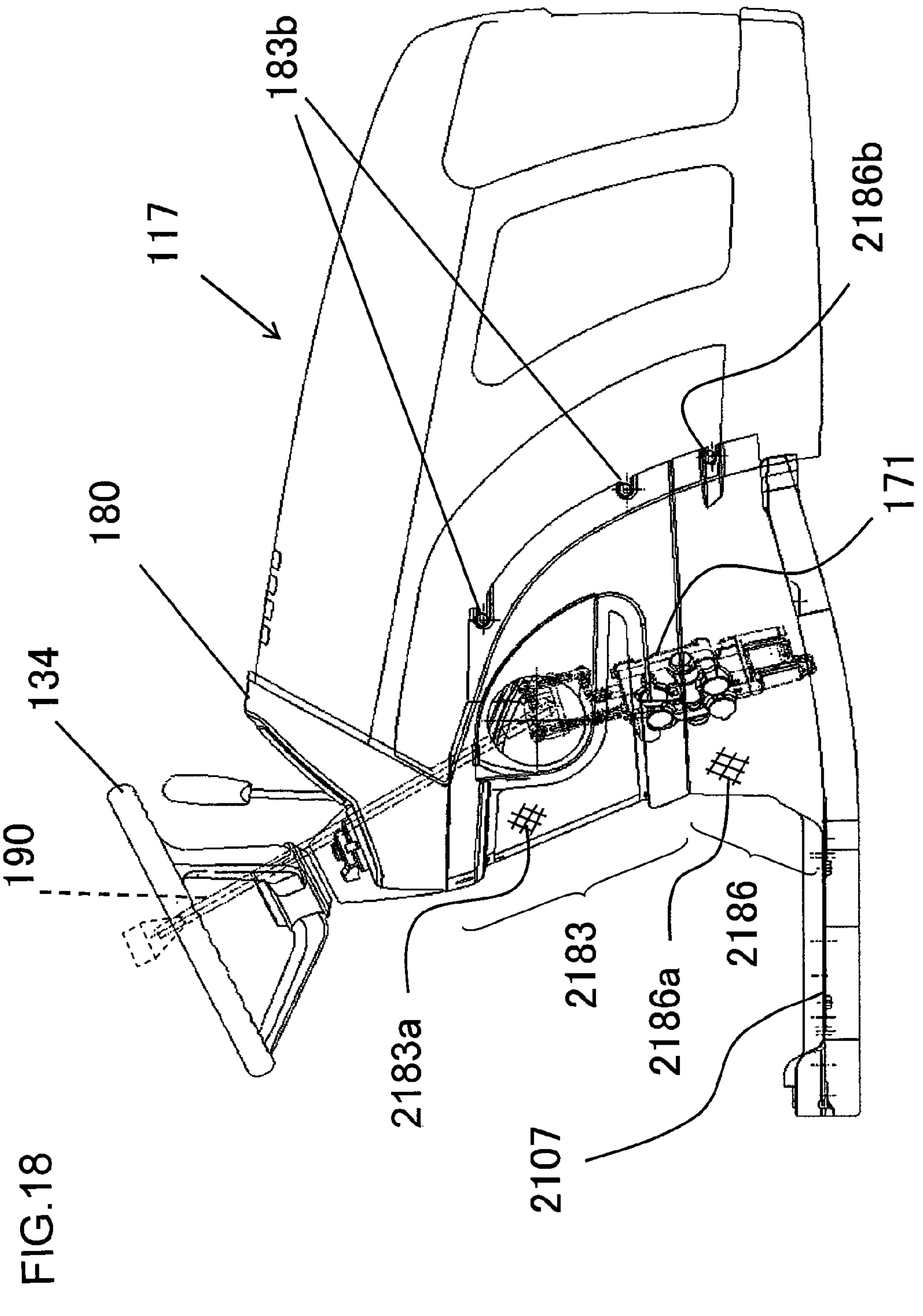
FIG. 18 is a schematic right side view illustrating the tractor body shown in FIG. 17.

FIG. 17 is a perspective view illustrating the front part of the tractor body for explaining the upper side cover 2183 and the lower side cover 2186, as the different Embodiment from the Embodiment shown in FIG. 2. FIG. 18 is a schematic right side view illustrating the tractor body shown in FIG. 17. In this case, the upper side cover 2183 has the same constitution as the top cover 183 described in the above embodiment has. On the other hand, as shown in FIGS. 17 and 18, the lower side cover 2186 is formed so as to stand up from a front portion of the second floor part 2107, to be constituted in a single unit with the second floor part 2107, and the lower side cover 2186 is disposed in a lower part of the space neighboring to the upper side cover 2183. Incidentally, an upper ventilation opening 2183*a* and a lower ventilation opening 2186*a* having a structure for blocking dust are formed in the upper side cover 2183 and the lower side cover 2186, respectively (see FIG. 18).

In this case, how to remove the upper side cover 2183 is the same as the top cover 183. And since the upper side cover 2183 can be removed, the working efficiency improves like the case of the top cover 183 described above. Further, since the lower side cover 2186 and the second floor part 2107 are constituted in a single unit, the number of parts can be reduced, and the simple constitution can be performed.

When the upper side cover 2183 and the lower side cover 2186 are removed, for instance, the maintenance and exchange of the valve 171 or the valve unit 170 can be also performed. In this case, since the lower side cover 2186 and the second floor part 2107 are constituted in a single unit, it is necessary to unfasten and remove not only a pair of right and left screws 2186*b* of the lower side cover 2186 (see FIG. 18) but also the screws (not illustrated) for fixing the second floor part 2107 to the chassis 104 (see FIG. 5).

In the case of FIG. 18, it has been described that the valve 171 is covered by the upper side cover 2183 and the lower side cover 2186. However, the invention described in this specification is not limited to this constitution. For instance, the valve 171 can be covered by the lower side cover 2186 and not be covered by upper side cover 2183 (not illustrated).

In the case of the above described embodiments, it has been described that all of the top cover 183, the bottom cover 184, and the middle cover 185 are detachably connected to the vehicle body. However, the invention described in this specification is not limited to this constitution. For instance, at least the middle cover 185 may be detachable. In this case, the simple check with respect to the structure parts such as the valve 171 can be performed.

In the case of the above described embodiments, it has been described that all of the upper side cover 2183 and the lower side cover 2186 are detachably connected to the vehicle body. However, the invention described in this specification is not limited to this constitution. For instance, at least the upper side cover 2183 may be detachable. In this case, the simple check with respect to the structure parts such as the valve 171 can be performed.

In the case of the above described embodiments, it has been described that the valve 171 is covered by the top cover 183, the bottom cover 184 and the middle cover 185. However, the invention described in this specification is not limited to this constitution. For instance, the valve 171 can be covered by the bottom cover 184 and the middle cover 185, but not be covered by the top cover 183 (see FIG. 19).

Figure 19:
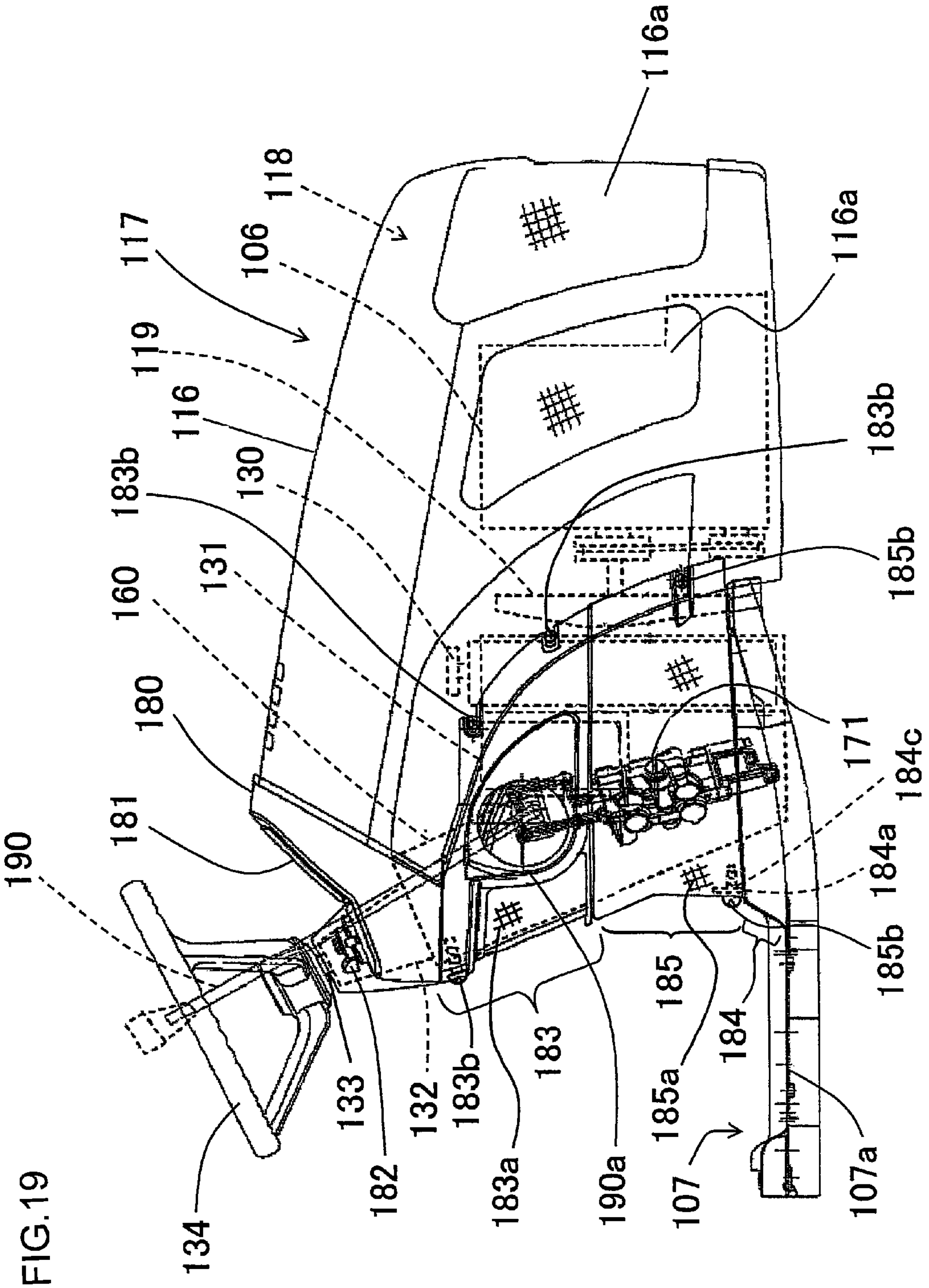
FIG. 19 is a schematic right side view illustrating the front part of the tractor body with a valve which is not covered by a top cover, but is covered by a bottom cover and a middle cover, according to a different Embodiment from the Embodiment shown in FIG. 2.

In this case, it is possible to carry out the check, repair, and exchange of the valve 171 even if the top cover 183 is not removed. FIG. 19 is a schematic right side view illustrating the front part of the tractor body with a valve 171 which is not covered by a top cover 183, but is covered by a bottom cover 184 and a middle cover 185, as the different Embodiment from the Embodiment shown in FIG. 2.

In the case of the above described embodiments, it has been described that the steering column frame 160 is provided with the concave part 162. However, the present invention is not limited to this constitution. For instance, the valve 171 can be disposed on the outside face of the steering column frame which is not provided with the concave part 162. In this case, since the valve 171 is disposed on the outside face of the steering column frame 160, it becomes easy to perform an assembling work, maintenance check work and the like with respect to the valve 171.

In the case of the above described embodiments, it has been described that the valve 171 is fixed to the steering column frame 160 by using the bracket 300. However, the present invention is not limited to this constitution. For instance, the valve 171 can be fixed directly to the steering column frame 160 without the bracket 300.

INDUSTRIAL APPLICABILITY

The working vehicle according to the present invention provides an effect that it is possible to provide a working vehicle having a constitution in which it can be easy to attach and detach a valve, and is effectively applied to a working vehicle to which the front loader, the mower unit or the like is attached.

REFERENCE SIGNS LIST

100 Tractor
101 Front wheel
102 Rear wheel
103 Operator's seat
104 Chassis
105 Tractor body
106 Engine
116 Engine hood
117 Driving force generating portion
118 Engine compartment
119 Radiator fan
120 Front loader
124 Bucket
160 Steering column frame (Post frame)
170 Valve unit
180 Control panel
183 Top cover
184 Bottom cover
185 Middle cover
190 Joy-stick control lever
2183 Upper side cover
2186 Lower side cover

What is claimed is:

1. A working vehicle to which an implement is attachable, comprising:

a steering wheel;

a steering column frame which supports the steering wheel and has a long shape in a vertical direction;

an operation lever which is disposed on a lateral side of the steering wheel;

a valve which is disposed on an outside face of the steering column frame and is connected to the operation lever; and a valve fixing member which fixes the valve to the steering column frame, wherein a recessed portion is formed on the outside face of the steering column frame, the whole or a part of the valve is disposed in the recessed portion, the steering column frame has a first side wall extending from a side face of the recessed portion to a front direction, a second side wall extending from the first side wall to a lateral direction, and a third side wall extending from the second side wall to a rear direction, the valve fixing member is fixed to the side face of the recessed portion, the first side wall, and any one of the third side wall and the second side wall, and the recessed portion is a space portion which is formed by bending a part of the outside face of the steering column frame to an inside direction of the steering column frame.

2. The working vehicle according to claim 1, comprising:

a link mechanism which connects the operation lever to the valve, wherein the valve, the link mechanism, and the operation lever are assembled in a single unit as a valve unit, and the valve unit is detachably fixed to the steering column frame.

3. The working vehicle according to claim 2, wherein the link mechanism is disposed above the valve and is connected to an end portion of the operation lever, and a lower portion of the operation lever is curved in a lateral direction and penetrates a side face of a cover that covers the steering column frame.

* * * * *